US011582100B2

(12) United States Patent
Janakiraman et al.

(10) Patent No.: US 11,582,100 B2
(45) Date of Patent: *Feb. 14, 2023

(54) SEAMLESS MULTI-CLOUD ROUTING AND POLICY INTERCONNECTIVITY

(71) Applicant: Cisco Technology, Inc., San Jose, CA (US)

(72) Inventors: Rajagopalan Janakiraman, Cupertino, CA (US); Sivakumar Ganapathy, Fremont, CA (US); Gianluca Mardente, San Francisco, CA (US); Giovanni Meo, Rome (IT); Patel Amitkumar Valjibhai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,792

(22) Filed: Apr. 13, 2022

(65) Prior Publication Data

US 2022/0239559 A1 Jul. 28, 2022

Related U.S. Application Data

(63) Continuation of application No. 17/244,941, filed on Apr. 29, 2021, now Pat. No. 11,329,876, which is a
(Continued)

(51) Int. Cl.
*G06F 15/177* (2006.01)
*H04L 41/0816* (2022.01)
(Continued)

(52) U.S. Cl.
CPC ...... *H04L 41/0816* (2013.01); *H04L 12/4641* (2013.01); *H04L 41/0806* (2013.01);
(Continued)

(58) Field of Classification Search
CPC .................. H04L 41/0816; H04L 41/0893
(Continued)

(56) References Cited

U.S. PATENT DOCUMENTS

2014/0244851 A1* 8/2014 Lee ..................... H04L 12/4641
709/228
2016/0112270 A1* 4/2016 Danait ................ H04L 41/0893
709/220
(Continued)

FOREIGN PATENT DOCUMENTS

WO 2017015667 A1 1/2017

OTHER PUBLICATIONS

International Search Report and Written Opinion from the International Searching Authority, dated Mar. 25, 2020, 12 pages, for corresponding International Patent Application No. PCT/US2020/013084.

*Primary Examiner* — Hee Soo Kim
(74) *Attorney, Agent, or Firm* — Polsinelli

(57) ABSTRACT

Technologies for multi-cloud routing and policy interconnectivity are provided. An example method can include assigning different sets of data plane routers to data plane traffic associated with different address spaces in a cloud site of a multi-cloud fabric to yield a distributed mapping of data plane traffic and data plane routers. The method can further include providing, to an on-premises site in the multi-cloud fabric, routing entries from a control plane router on the cloud site, the routing entries reflecting the distributed mapping and identifying, for each address space, which data plane router handles data plane traffic for that address space; and when a data plane router is deployed at the cloud site, providing, to the on-premises site, updated routing information from the control plane router, the updated routing information identifying the data plane router as a next hop
(Continued)

for data plane traffic associated with a respective address space.

20 Claims, 12 Drawing Sheets

Related U.S. Application Data continuation of application No. 16/252,115, filed on Jan. 18, 2019, now Pat. No. 11,012,299.

(51) Int. Cl.
*H04L 12/46* (2006.01)
*H04L 41/0806* (2022.01)
*H04L 41/0893* (2022.01)
*H04L 45/02* (2022.01)
*H04L 45/44* (2022.01)

(52) U.S. Cl.
CPC .......... *H04L 41/0893* (2013.01); *H04L 45/02* (2013.01); *H04L 45/04* (2013.01); *H04L 45/44* (2013.01)

(58) Field of Classification Search
USPC .......................................................... 709/220
See application file for complete search history.

(56) References Cited

U.S. PATENT DOCUMENTS

| 2016/0191324 | A1  | 6/2016 | Olofsson et al. |            |
|--------------|-----|--------|-----------------|------------|
| 2017/0026417 | A1* | 1/2017 | Ermagan         | H04L 63/0272 |
| 2018/0145886 | A1* | 5/2018 | Rao             | H04L 43/028 |
| 2020/0007584 | A1* | 1/2020 | Dixit           | H04L 43/08 |
| 2020/0186426 | A1* | 6/2020 | Mohanram        | H04L 41/0873 |

* cited by examiner

SEAMLESS MULTI-CLOUD ROUTING AND POLICY INTERCONNECTIVITY

CROSS-REFERENCE TO RELATED APPLICATION

The instant application is a Continuation of, and claims priority to, U.S. patent application Ser. No. 17/244,941 entitled SEAMLESS MULTI-CLOUD ROUTING AND POLICY INTERCONNECTIVITY, filed Apr. 29, 2021, which is a Continuation of, and claims priority to, U.S. patent application Ser. No. 16/252,115, entitled SEAMLESS MULTI-CLOUD ROUTING AND POLICY INTERCONNECTIVITY, filed Jan. 18, 2019, the contents of which are herein incorporated by reference in their entireties.

TECHNICAL FIELD

The present technology pertains to cloud computing, and more specifically to multi-cloud policy and routing scaling and normalization.

BACKGROUND

The ubiquity of Internet-enabled devices has created an enormous demand for Internet services and content. We have become a connected society where users are increasingly reliant on network services and content. This Internet-connected revolution has created significant challenges for service and content providers who often struggle to service a high volume of user requests without falling short of user performance expectations. For example, cloud providers typically need large and complex datacenters to keep up with network and content demands from users. These datacenters are generally equipped with server farms configured to host specific services, and include numerous switches and routers programmed to route datacenter traffic and enforce a large amount of security policies. In many instances, a specific datacenter is expected to handle millions of traffic flows and enforce numerous security requirements.

Private networks owned by entities such as enterprises or organizations similarly have increasing demands for computing resources and performance. To satisfy such increasing demands, such entities often purchase compute resources and services from cloud providers. For example, such entities can create a virtual private cloud or network on a public cloud and connect the virtual private cloud or network to their private or on-premises network in order to grow their available compute resources and capabilities. In this way, the entities can interconnect their private or on-premises datacenter with a remote datacenter hosted on a public cloud, and thereby extend their private network.

Unfortunately, the lack of uniformity in the policy models and configuration restrictions between datacenter and cloud provider solutions significantly limit an entity's ability to integrate disparate environments and apply a consistent policy and routing model across datacenter environments. For example, Cisco's software-defined network and datacenter management solution, the Application-Centric Infrastructure (ACI), supports hundreds of thousands of security policies, including 128K contract rules, 64K Internet Protocol (IP) addresses, and 4K endpoint groups (EPGs) per leaf switch. By contrast, Amazon's public cloud solution, Amazon Web Services (AWS), has a restriction of 250 security rules per endpoint, which is orders of magnitude smaller than the scale of policies supported by the ACI. Consequently, the disparate policy models and configuration restrictions between cloud and datacenter solutions can significantly limit the scalability and uniformity of policies and routing in hybrid cloud implementations.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
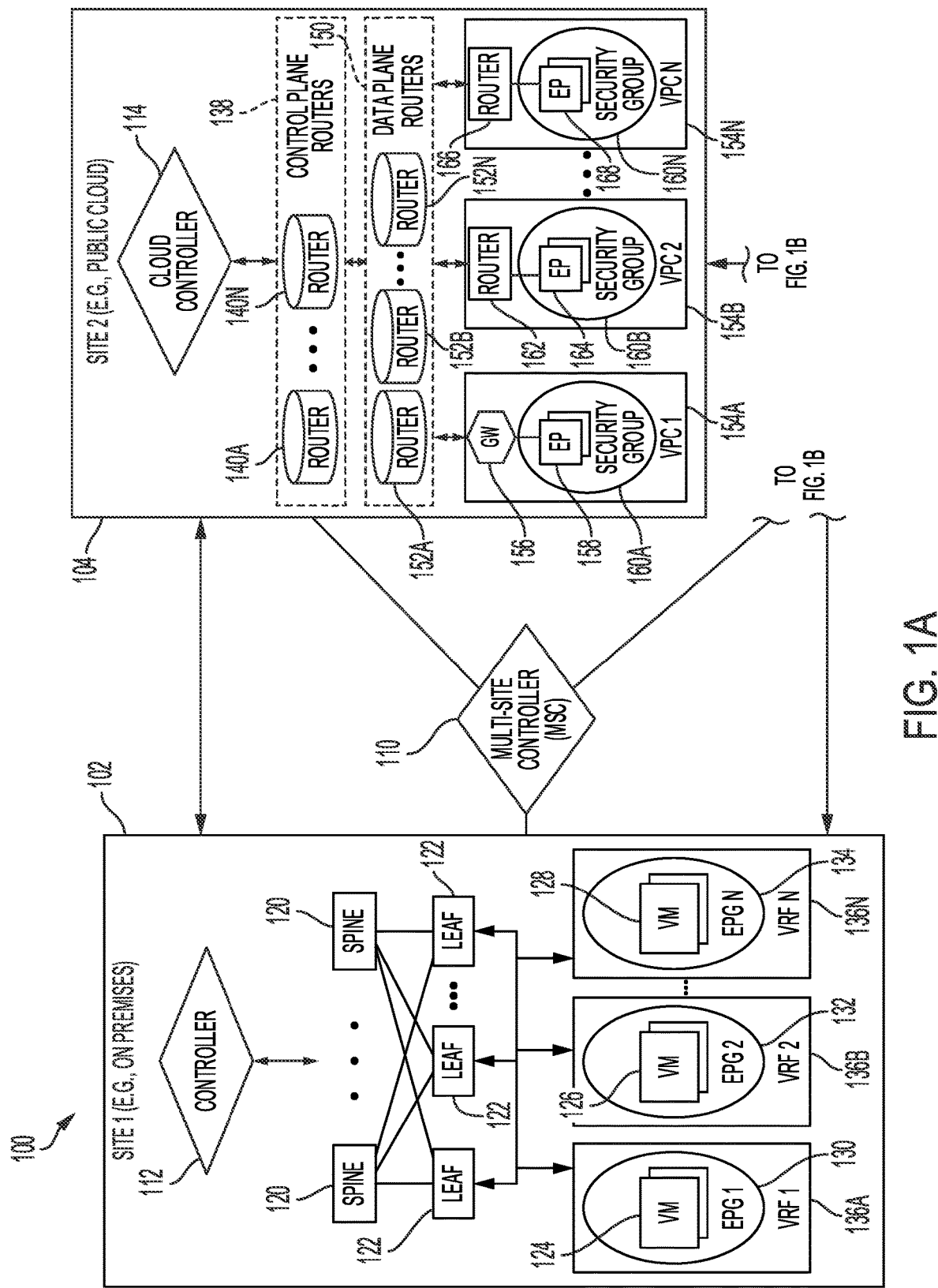
FIGS. 1A and 1B illustrate an example architecture for policy scaling and integration in a multi-cloud fabric including an on-premises site and public clouds.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for seamless routing and policy interconnectivity and normalization in multi-cloud fabrics. In some examples, a method is provided for seamless routing and policy interconnectivity and normalization in multi-cloud fabrics. The method can include assigning different sets of data plane routers from a plurality of data plane routers to data plane traffic associated with different address spaces in a cloud site of a multi-cloud fabric to yield a distributed mapping of data plane traffic and data plane routers. The multi-cloud fabric can include, for example, one or more on-premises sites and/or cloud sites. Moreover, the different address spaces can include different private networks, different virtual routing and forwarding (VRF) instances, different virtual private clouds (VPCs), different virtual networks (e.g., VNETs), different network segments, different network contexts, etc.

The method can further include providing, to an on-premises site in the multi-cloud fabric, routing entries from a control plane router on the cloud site. The routing entries can reflect the distributed mapping of data plane traffic and data plane routers and identify, for each address space, which of the different sets of data plane routers handles data plane traffic for that address space. The control plane router can be one of a set of control plane routers in the cloud site that are configured to handle control plane traffic associated with the cloud site and exchange routing information with the on-premises site (and/or any other device or site in the multi-cloud fabric). In some aspects, the set of control plane routers can include at least two control plane routers for each remote site in the multi-cloud fabric. The at least two control plane routers can include all or some of the routes in the cloud site, can provide control plane redundancy, and can establish control plane sessions, such as border gateway protocol (BGP) sessions, with other sites to exchange routing information and routing updates.

The method can also include, in response to one or more data plane routers being deployed at the cloud site, providing, to the on-premises site, updated routing information from the control plane router. The updated routing information can identify the one or more data plane routers as a next hop for data plane traffic associated with a respective address space. The on-premises site can receive the updated routing information and update its routes or table of routes for the cloud site.

In some cases, the one or more data plane routers (and any other data plane router) can be deployed on demand based on one or more conditions, such as a traffic overload condition, an available bandwidth reaching a minimum threshold, a maximum routing capacity reaching a threshold, a performance requirement, etc. The one or more conditions can trigger the deployment or undeployment of one or more data plane routers. In some cases, one or more of the set of control plane routers can double up as data plane routers either in addition to or in lieu of one or more data plane routers. For example, instead of (or in addition to) triggering the deployment of one or more data plane routers, the one or more conditions can trigger one or more of the set of control plane routers to double up as one or more data plane routers.

In some aspects, a system for seamless routing and policy interconnectivity and normalization in multi-cloud fabrics is provided. The system can include one or more processors and at least one computer-readable storage medium having stored therein instructions which, when executed by the one or more processors, cause the system to assign different sets of data plane routers from a plurality of data plane routers to data plane traffic associated with different address spaces in a cloud site on a multi-cloud fabric that includes one or more on-premises sites and/or cloud sites, to yield a distributed mapping of data plane traffic and data plane routers; provide, to an on-premises site, routing entries from a control plane router on the cloud site that reflect the distributed mapping of data plane traffic and data plane routers and that identify, for each address space, which of the different sets of data plane routers handles data plane traffic for that address space; and in response to one or more data plane routers being deployed at the cloud site, provide, to the on-premises site, updated routing information from the control plane router that identifies the one or more data plane routers as a next hop for data plane traffic associated with a respective address space.

The on-premises site can receive the updated routing information and update its routes or table of routes for the cloud site. In some cases, the one or more data plane routers (and any other data plane router) can be deployed on demand based on one or more conditions, such as a traffic overload condition, an available bandwidth reaching a minimum threshold, a maximum routing capacity reaching a threshold, a performance requirement, etc. The one or more conditions can trigger the deployment or undeployment of one or more data plane routers.

The different address spaces can include, for example, different private networks, different virtual routing and forwarding (VRF) instances, different virtual private clouds (VPCs), different virtual networks (e.g., VNETs), different network segments, different network contexts, etc. Moreover, the control plane router can be one of a set of control plane routers in the cloud site configured to handle control plane traffic associated with the cloud site and exchange routing information with the on-premises site (and/or other sites and devices in the multi-cloud fabric). In some cases, the set of control plane routers can include at least two control plane routers for each remote site in the multi-cloud fabric. The at least two control plane routers can include all or some of the routes in the cloud site, can provide control plane redundancy, and can establish control plane sessions, such as BGP sessions, with other sites to exchange routing information and routing updates.

In some aspects, a non-transitory computer-readable storage medium for seamless routing and policy interconnectivity and normalization in multi-cloud fabrics is provided. The non-transitory computer-readable storage medium can include instructions stored therein instructions which, when executed by one or more processors, cause the one or more processors to assign different sets of data plane routers from a plurality of data plane routers to data plane traffic associated with different address spaces in a cloud site on a multi-cloud fabric that includes one or more on-premises sites and/or cloud sites, to yield a distributed mapping of data plane traffic and data plane routers; provide, to an on-premises site, routing entries from a control plane router on the cloud site that reflect the distributed mapping of data plane traffic and data plane routers and that identify, for each address space, which of the different sets of data plane routers handles data plane traffic for that address space; and in response to one or more data plane routers being deployed at the cloud site, provide, to the on-premises site, updated routing information from the control plane router that identifies the one or more data plane routers as a next hop for data plane traffic associated with a respective address space.

The on-premises site can receive the updated routing information and update its routes or table of routes for the cloud site. In some cases, the one or more data plane routers (and any other data plane router) can be deployed on demand based on one or more conditions, such as a traffic overload condition, an available bandwidth reaching a minimum threshold, a maximum routing capacity reaching a threshold, a performance requirement, etc. The one or more conditions can trigger the deployment or undeployment of one or more data plane routers.

The different address spaces can include, for example, different private networks, different virtual routing and forwarding (VRF) instances, different virtual private clouds (VPCs), different virtual networks (e.g., VNETs), different network segments, different network contexts, etc. Moreover, the control plane router can be one of a set of control plane routers in the cloud site configured to handle control plane traffic associated with the cloud site and exchange routing information with the on-premises site (and/or other sites and devices in the multi-cloud fabric). In some cases, the set of control plane routers can include at least two control plane routers for each remote site in the multi-cloud fabric. The at least two control plane routers can include all or some of the routes in the cloud site, can provide control plane redundancy, and can establish control plane sessions, such as BGP sessions, with other sites to exchange routing information and routing updates.

In some aspects, the system, method, and non-transitory computer-readable medium described above can include translating a respective type of private or virtual network construct (e.g., VPC, VNET, etc.) in the one or more cloud sites to match a set of policies and configuration settings associated with a specific type of private or virtual network construct (e.g., VRF) in the on-premises site to yield a normalized private or virtual network across the multi-cloud fabric, and providing interconnectivity between the on-premises site and the one or more cloud sites using the normalized private or virtual network.

In some aspects, the system, method, and non-transitory computer-readable medium described above can include normalizing a plurality of policy constructs across the multi-cloud fabric. In some examples, the policy constructs can be normalized by mapping policy constructs in the on-premises site to respective policy constructs in the one or more cloud sites; translating each policy construct from the respective policy constructs to mirror a respective one of the policy constructs from the on-premises site that is mapped to the policy construct from the respective policy constructs; and in response to receiving traffic associated with endpoints in the policy construct from the respective policy constructs and/or the respective one of the policy constructs from the on-premises site, applying, to the traffic, a set of policies associated with the policy construct from the respective policy constructs and the respective one of the policy constructs from the on-premises site.

The policy constructs in the on-premises site can be of a different type than the respective policy constructs in the one or more cloud sites. In some cases, the policy constructs in the on-premises site include endpoint groups (EPGs) or VRFs, and each of the respective policy constructs in the one or more cloud sites includes a respective type of security group or private network (e.g., VPC, VNET, etc.) supported by an associated cloud site from the one or more cloud sites. Each EPG or VRF can contain a set of endpoints from the on-premises site and each of the respective policy constructs in the one or more cloud sites can be associated with a respective set of endpoints from each of the one or more cloud sites.

In some aspects, the system, method, and non-transitory computer-readable medium described above can include normalizing policy constructs by stretching a policy construct from the on-premises site to the one or more cloud sites to yield a stretched policy construct on each of the one or more cloud sites, the stretched policy construct representing a respective policy construct in each of the one or more cloud sites; for each endpoint in the one or more cloud sites that is mapped to the stretched policy construct, providing, to the on-premises site, an address (e.g., IP address, IP prefix, subnet, etc.) of the endpoint; mapping the address of the endpoint to a shadow policy construct on the on-premises site which mirrors the stretched policy construct on each of the one or more cloud sites; and for each endpoint in the policy construct from the on-premises site, mapping the endpoint to a respective shadow policy construct on each of the one or more cloud sites, where the respective shadow policy construct mirrors the policy construct from the on-premises site.

In some aspects, the system, method, and non-transitory computer-readable medium described above can include normalizing policy constructs by creating, for a policy construct in the on-premises site, an associated policy construct on each of the one or more cloud sites, which is (the associated policy construct) of a different type than the policy construct in the on-premises site; for each associated policy construct on each of the one or more cloud sites, provisioning, on the on-premises site, a respective shadow policy construct mirroring the associated policy construct; for the policy construct in the on-premises site, provisioning, on each of the one or more cloud sites, a respective shadow policy construct mirroring the policy construct in the on-premises site; for each endpoint in the one or more cloud sites that is mapped to the associated policy construct, providing, to the on-premises site, an address of the endpoint; and based on the address of each endpoint, mapping each endpoint in the one or more cloud sites to the respective shadow policy construct provisioned on the on-premises site.

In some cases, the normalizing of policy constructs can also include establishing a respective security policy for traffic between the policy construct in the on-premises site and each associated policy construct on each of the one or more cloud sites; mapping each endpoint in the policy construct in the on-premises site to the respective shadow policy construct on each of the one or more cloud sites. In some cases, the normalizing of policy constructs can further include providing, in response to discovering a new endpoint in a cloud site, a respective address of the new endpoint to the on-premises site, and based on the respective address of the new endpoint, mapping the new endpoint to the respective shadow policy construct provisioned on the on-premises site.

In some aspects, the system, method, and non-transitory computer-readable medium described above can include distributing security policies associated with endpoints in the cloud site across the plurality of data plane routers, with each data plane router receiving a respective subset of the security policies associated with a set of endpoints mapped to that data plane router; advertising, by each data plane router from the plurality of data plane routers, to each private or virtual network (e.g., each VPC or VNET) in the cloud site that contains one or more of the set of endpoints mapped to that data plane router, a respective set of routes associated with the set of endpoints; based on BGP route maps, preventing each data plane router in the plurality of data plane routers from advertising routes associated with those of the endpoints in the cloud site that are not mapped to that data plane router; and in response to receiving traffic associated with one or more of the set of endpoints, applying, to the traffic via the data plane router mapped to the set of endpoints, one or more of the respective subset of the security policies associated with the set of endpoints.

DESCRIPTION OF EXAMPLE EMBODIMENTS

The disclosed technologies address the need in the art for elastic and seamless policy and routing interconnectivity and normalization in multi-cloud fabrics. The approaches herein can integrate policies across disparate cloud or datacenter environments in a multi-cloud fabric and support elastic routing and policy scaling and normalization across the disparate cloud or datacenter environments, despite any differences in architecture, limitations, and policy restrictions between the cloud or datacenter environments. For example, the approaches herein can extend a cloud or datacenter solution, such as Cisco's Application-Centric Infrastructure (ACI), across multiple datacenters or public clouds to apply a consistent policy model and routing scheme across the datacenters or clouds. The number of security policies implemented across the datacenters or clouds can be scaled to exceed policy restrictions or limitations imposed by one or more cloud providers in the multi-cloud fabric. The approaches herein can thus provide routing normalization and increased policy uniformity, flexibility and granularity across the multi-cloud fabric.

Figure 1B:
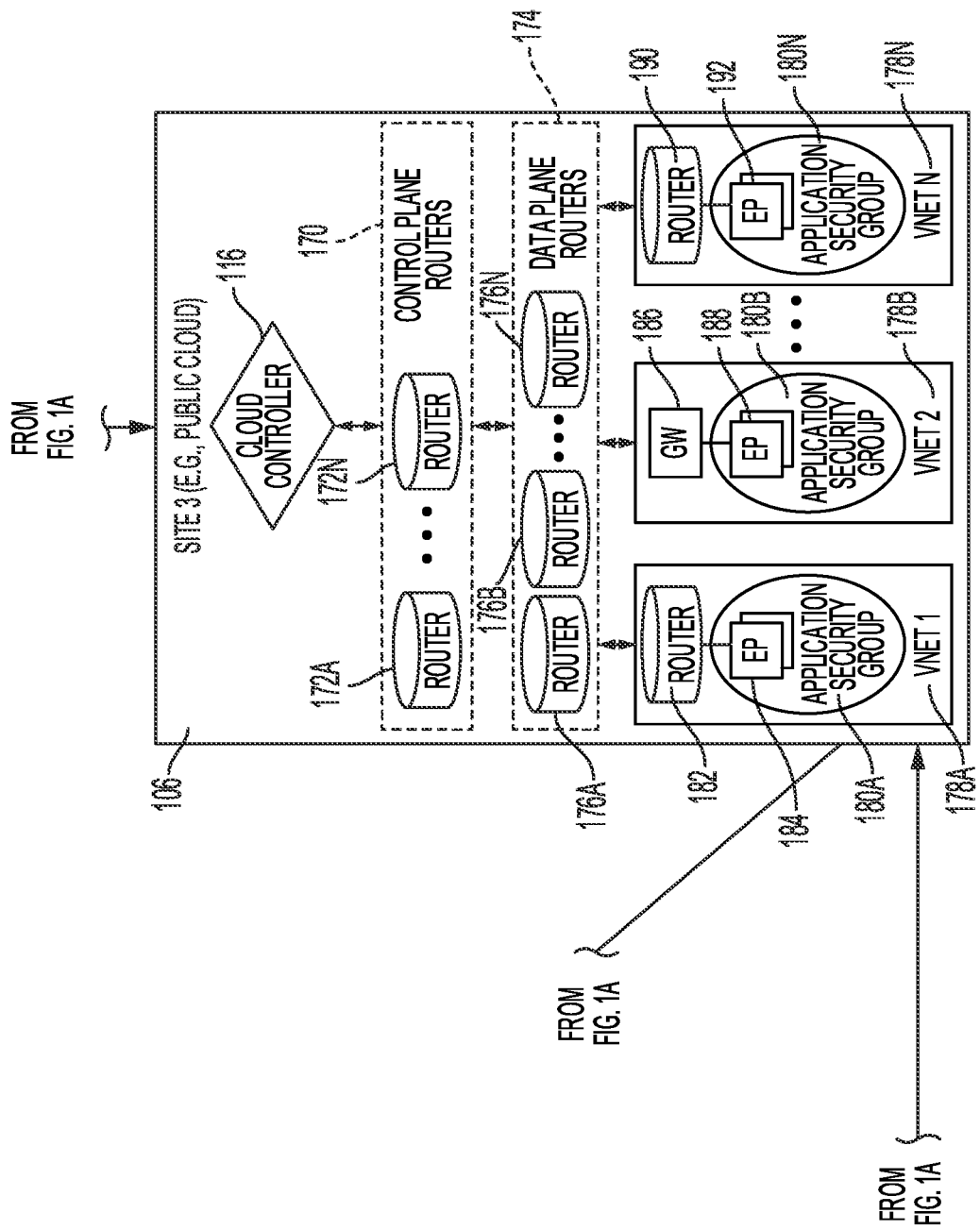
Figure 8:
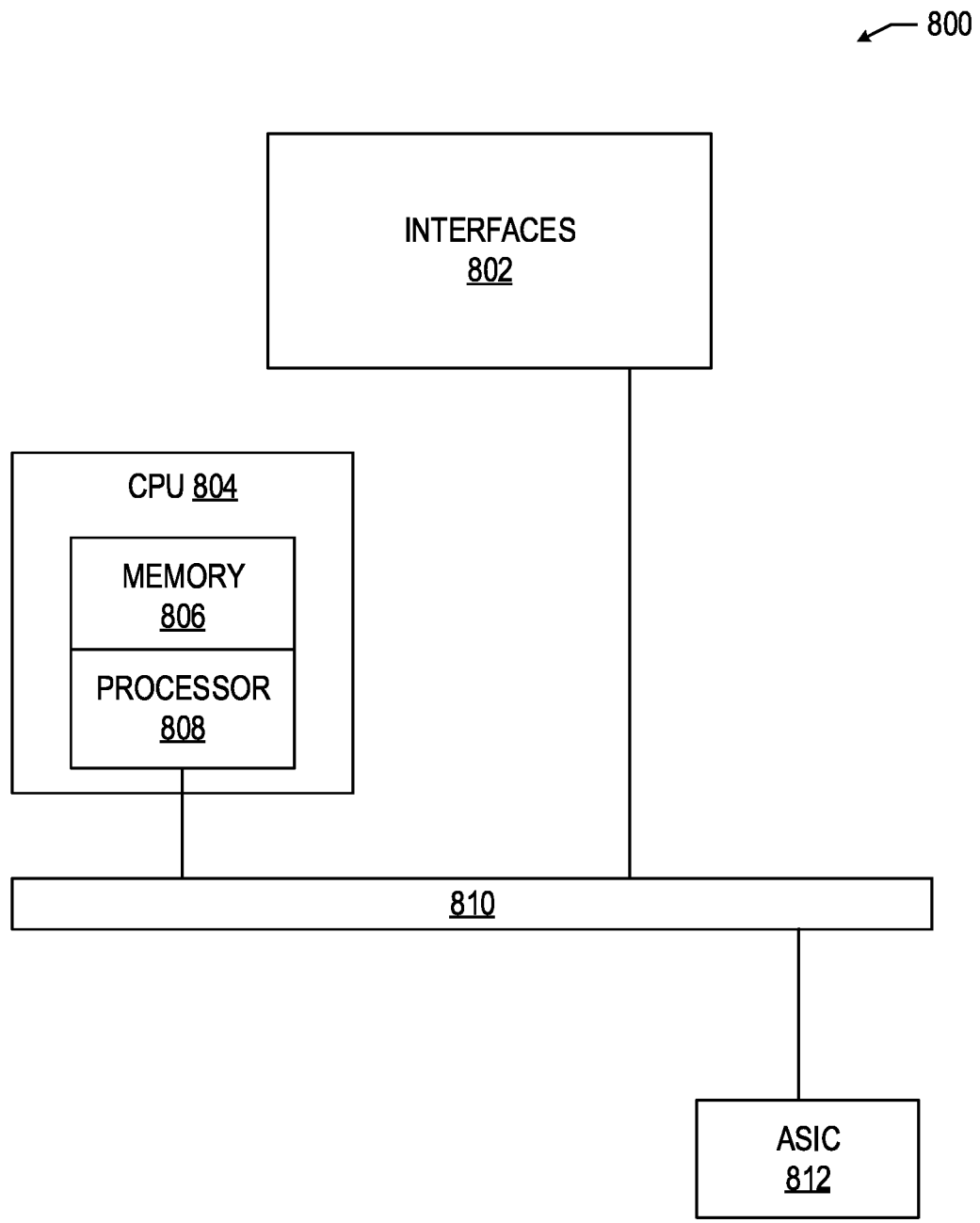
FIG. 8 illustrates an example network device in accordance with various examples.
Figure 9:
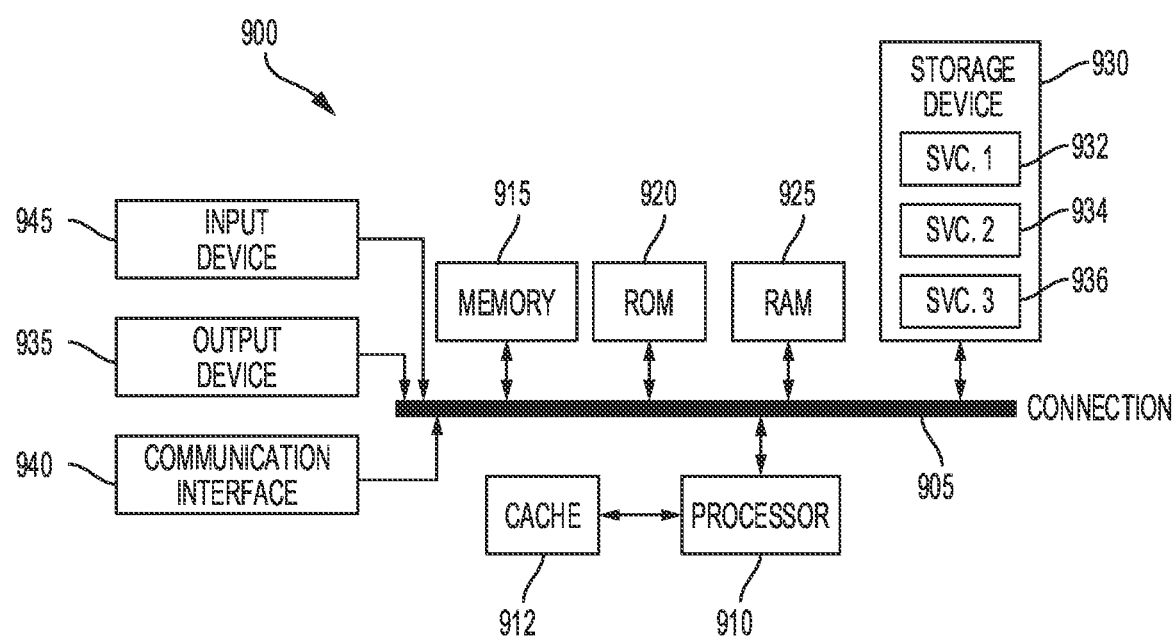
FIG. 9 illustrates an example computing device in accordance with various examples.

The present technologies will be described in more detail in the following disclosure as follows. The discussion begins with an overview of routing and policy normalization and scaling in a multi-cloud fabric. The discussion continues with a description of an example architecture for routing and policy normalization and scaling in a multi-cloud fabric, as illustrated in FIGS. 1A and 1B. A description of example strategies and configurations for routing and policy normalization and scaling in a multi-cloud fabric, as illustrated in FIGS. 2A through 7, will then follow. The discussion concludes with a description of an example network device, as illustrated in FIG. 8, and an example computing device architecture, as illustrated in FIG. 9, including example hardware components suitable for performing networking and computing operations. The disclosure now turns to a discussion of routing and policy normalization and scaling in a multi-cloud fabric.

A multi-cloud fabric or datacenter solution, such as Cisco's Application-Centric Infrastructure (ACI), can manage network, security, and services for workloads in multiple network fabrics or datacenters, such as an on-premises datacenter and one or more cloud sites. The multi-cloud solution can group endpoints into groups or collections of endpoints called endpoint groups (EPGs), and apply security policies or contracts to corresponding EPGs. With the multi-cloud solution, an EPG can include endpoints in both the on-premises datacenter and the public cloud(s). The EPGs allow security policies or contracts to be enforced for traffic from endpoints on both the on-premises datacenter and the public cloud(s). The security policies and networking configurations can be managed by one or more controllers associated with the multi-cloud solution, such as an ACI Application Policy Infrastructure Controller (APIC) and/or a multi-site APIC.

As previously mentioned, networking configurations and policies in public clouds can have various routing and policy models or schemes, and different restrictions imposed by the cloud providers. In many cases, a cloud provider may impose restrictions which limit the number of security policies supported by an associated public cloud much below the scale of policies supported by the datacenter solution implemented at the on-premises data center. For example, Cisco's ACI supports hundreds of thousands security policies, including 128K contract rules, 64K IP addresses, and 4K EPGs per leaf switch, while Amazon's AWS has a restriction of 250 security rules per endpoint. Accordingly, when Cisco's ACI solution is integrated with a public cloud solution, such as Amazon's AWS, the public cloud's restrictions can impose unnecessary restrictions on the ACI solution and create inconsistent policy models.

Security rules on the cloud can be applied to destination endpoints and Layer 4 (L4) ports. Destination endpoints can be classified by a group, a prefix, a label, an IP address, etc., depending on the cloud or datacenter solution. While grouping endpoints or traffic based on common criteria helps in scaling security rules, the different traffic categorization schemes and policy models implemented by different cloud or datacenter solutions can limit policy and routing uniformity and often prevent integration of security rules across different cloud or datacenter environments.

For example, Cisco's ACI can use EPGs to apply security policies, which are enforced on hardware switches or routers, to groups of endpoints. On the other hand, other cloud providers and solutions, such as Amazon's AWS or Microsoft's Azure cloud computing platform, use IP addresses or other attributes to classify traffic or endpoints in specific security groups and apply security policies, which are enforced by hosts (e.g., servers), to the traffic or endpoints in the specific security groups. The different classification, policy enforcement, and policy schemes in the various cloud or datacenter solutions can limit uniformity and integration across the different cloud or datacenter solutions.

Moreover, restrictions imposed by one cloud provider can create significant limitations across the multi-cloud or multi-fabric environment. For example, when a cloud host instance runs multiple applications, the security rule limit imposed by a cloud provider can quickly be reached at the provider's cloud, limiting the amount of security rules that can be integrated from another cloud or datacenter fabric or environment. For example, assume there are 5 containers running on a cloud host and the 5 containers are port mapped. The 250 rule limit imposed by Amazon's AWS solution will be reached with 25 external IPs talking to the host: 25 IPs×5 TCP (Transmission Control Protocol) ports×2 directions. While having prefix-based rules can help with this scale limitation, this restriction becomes severe when security group policies need to be applied to individual IP addresses (e.g., /32 IPs). Yet /32 IP addresses may be necessary or desirable in various cases. For example, /32 IP addresses may be necessary or desirable to support micro-segmentation or compute label-based grouping, where IP subnet and policy are essentially decoupled.

In addition, for multi-cloud interconnect, public clouds often do not provide a Layer 2 (L2) stretch. This in turn means that security group policies need to be applied on Layer 3 (L3) constructs, which can become significantly limited by the cloud provider's resource scale limits as mentioned above. To illustrate, assume a cloud hosted "shared service" is used by 100s of EPGs in an ACI on-premises site, and hence by 1000s of endpoints. This means that the ACI endpoint IP addresses inside a public cloud, such as AWS or Azure, should be enumerated in order to program the cloud security policies. However, given the typical cloud-imposed scale limitations, enumerating 1000s of IP addresses will not scale in the cloud. Moreover, for any policy change, the security group entries across all the 1000s of IP addresses have to be re-enumerated, thereby causing additional scalability issues.

To overcome the scale limits imposed by various cloud providers and the lack of uniformity and integration between cloud or datacenter solutions, the approaches herein can provide policy and routing normalization and scaling in a multi-fabric or multi-cloud environment. This can be achieved by, among other things, decoupling the control plane and the data plane in a multi-fabric or multi-cloud environment, and using a combination of native cloud routing capabilities and a cluster of custom cloud routers, such as Cisco's cloud services routers (CSRs) 10001kv, to obtain interconnect functionality at scale.

FIGS. 1A and 1B illustrate an example architecture for seamless interconnect functionality in a multi-cloud fabric 100. The multi-cloud fabric 100 can include an on-premises site 102 (e.g., Site 1), such as a private cloud or datacenter, and public clouds 104 and 106 (e.g., Site 2 and Site 3). In this example, the on-premises site 102 may implement a specific SDN or datacenter solution, such as Cisco's ACI, while the public clouds 104 and 106 may implement different cloud solutions, such as Amazon's AWS and Microsoft's Azure.

The on-premises site 102 can be configured according to the specific SDN or datacenter solution implemented by the on-premises site 102, such as Cisco's ACI, which can be implemented and/or managed via one or more controllers, such as controller 112 (e.g., APIC). The controller 112 can manage security policies and interconnectivity for elements in the on-premises site 102, such as switches (e.g., leaf switches, spine switches, etc.), routers (e.g., physical or virtual gateways or routers, etc.), endpoints (e.g., VMs, software containers, virtual appliances, servers, applications, service chains, workloads, etc.), and/or any other element (physical and/or virtual/logical) in the on-premises site 102. For example, the on-premises site 102 can include spine switches 120 and leaf switches 122 configured to provide network connectivity to VMs 124, 126, and 128 in the on-premises site 102. In this example, the controller 112 can manage security policies and interconnectivity for traffic processed by the spine switches 120, the leaf switches 122, and the VMs 124, 126, and 128.

The controller 112 can configure EPGs 130, 132, and 134 (EPG 1, EPG 2, EPG N), which can be used to manage and implement policies and configurations for groups of endpoints (e.g., VMs 124, 126, 128). EPGs (e.g., 130, 132, 134) are managed objects that contain endpoints (e.g., VMs, software containers, virtual appliances, servers, applications, service chains, workloads, etc.) that are connected to the network (e.g., on-premises site 102) either directly or indirectly. Each EPG (130, 132, 134) can include a group of endpoints. For example, EPG 130 can include VMs 124, EPG 132 can include VMs 126, and EPG 134 can include VMs 128.

The endpoints (e.g., VMs 124, 126, 128) in the EPGs 130, 132, 134 can have certain attributes, such as an address, location, identity, prefix, functionality, application service, etc., and can be physical and/or virtual. EPGs are thus logical grouping of such endpoints based on one or more common factors. Non-limiting example factors which can be used to group endpoints into a common EPG include common security requirements, common VM mobility requirements, common QoS (quality-of-service) settings, common L4-L7 (Layer 4 through Layer 7) services, etc. EPGs (e.g., 130, 132, 134) can span multiple switches and can be associated with respective bridge domains (BDs). In some aspects, endpoint membership in an EPG can be static or dynamic.

EPGs 130, 132, 134 can contain respective endpoint memberships and can represent different EPGs (e.g., logical groupings) that are based on different, respective factors as previously explained. For example, EPG 130 may represent a logical grouping of endpoints (e.g., VMs 124) configured as web servers (e.g., WEB-EPG), EPG 132 may represent a logical grouping of endpoints (e.g., VMs 126) configured as database servers (e.g., DB-EPG), and EPG 134 may represent a logical grouping of endpoints (e.g., VMs 128) configured as specific application servers (e.g., APP.A-EPG). The controller 112 can configure specific policies (e.g., contracts, filters, requirements, etc.) for each of the EPGs 130, 132, 134. Such policies or contracts can define, for example, what EPGs can communicate with each other and what type of traffic can pass between the EPGs 130, 132, 134.

The controller 112 can also configure virtual routing and forwarding (VRF) instances (136A, 136B, 136N) which provide different address domains that serve as private networks and segregate traffic between the VRFs. The VRFs 136A-N can include various, respective objects such as endpoints (e.g., VMs 124, 126, 128) EPGs (e.g., 130, 132, 134), etc. For example, VMs 124 and EPG 130 can reside in VRF 136A, VMs 126 and EPG 132 can reside in VRF 136B, and VMs 128 and EPG 134 can reside in VRF 136N.

The multi-cloud fabric 100 can also include a multi-site controller 110 (e.g., multi-site APIC) which communicates with controller 112 in the on-premises site 102 and cloud controllers 114 and 116 (e.g., cloud APICs) respectively on the public cloud 104 and the public cloud 106, and works with controller 112 and cloud controllers 114 and 116 to manage and implement policies and configurations on both the on-premises site 102 and the public clouds 104 and 106. The multi-site controller 110 can implement a same policy model on the on-premises site 102 and the public clouds 104 and 106, which can be based on a particular SDN or datacenter solution such as Cisco's ACI. For example, the multi-site controller 110 can implement VRFs, EPGs and associated policies on the on-premises site 102 as well as the public clouds 104 and 106. Such policies can be coordinated by the multi-site controller 110 with the controller 112 in the on-premises site 102 and the cloud controllers 114 and 116 in the public clouds 104 and 106, respectively.

The public clouds 104 and 106 can also implement different policy models and may have their own sets of requirements (e.g., policy requirements, scalability requirements, etc.) which may differ from those imposed by the solution implemented by the multi-site controller 110, the controller 112, and the cloud controllers 114 and 116. The policy models and requirements on the public clouds 104 and 106 can depend on the respective cloud providers. For example, AWS may implement security groups and impose a 250-rule limit, and Azure may implement application or network security groups with different policy restrictions and limitations. As further described below, the approaches herein can integrate and scale routing, policies, and requirements imposed by the public clouds 104 and 106 with those associated with the multi-site controller 110, the controller 112, and the cloud controllers 114 and 116, in order to apply a consistent routing and policy model and increase the scalability of the overall solution implemented on the multi-cloud fabric 100, including the public clouds 104 and 106.

The public cloud 104 can include virtual private clouds (VPCs) 154A, 154B, and 154N, which represent private networks on the public cloud 104 and which can be interconnected with the on-premises site 102 and the public cloud 106 as described herein. The VPCs 154A, 154B, and 154N can host applications and resources on the public cloud 104 for use by the on-premises site 102. In some cases, the VPCs 154A, 154B, and 154N can represent or map to VRFs (e.g., 136A, 136B, 136N) on the on-premises site 102.

The VPCs 154A, 154B, and 154N can include endpoints (EPs) 158, 164, and 168 on the public cloud 104. For example, VPC 154A can include EPs 158, VPC 154B can include EPs 164, and VPC 154N can include EPs 168. The EPs 158, 164, 168 can include virtual/logical and/or physical endpoints, such as VMs, software containers, physical servers, etc. The EPs 158, 164, 168 can be included in security groups 160A, 160B, 160N, which are policy constructs implemented by the public cloud 104, and which can be translated to EPGs as described herein. The security groups 160A, 160B, 160N can include one or more respective security policies defined for traffic matching one or more attributes associated with the security groups 160A, 160B, 160N, such as IP addresses (e.g., the IP addresses of EPs 158, 164, 168 in the security groups 160A, 160B, 160N), labels (e.g., VM labels or tags), EP attributes (e.g., VM names or characteristics), IP prefixes, etc.

Traffic to and from the VPCs 154A, 154B, and 154N can be routed via routers 156, 162, and 166, which can include virtual cloud routers, virtual private gateways or VPN gateways (hereinafter "vGWs"), cloud services routers (CSR) such as Cisco CSR1kV routers, and the like. The routers 156, 162, 166 can serve as the ingress and egress points of the VPCs 154A, 154B, 154N, and can interconnect the VPCs 154A, 154B, 154N with each other as well as other external devices or networks (e.g., on-premises site 102 and public cloud 106) through a cluster 150 of data plane routers 152A, 152B, 152N. The data plane routers 152A, 152B, 152N can include virtual cloud routers, virtual gateways, CSR routers such as Cisco CSR1kV routers, and the like.

The routers 156, 162, and 166 can provide interconnectivity between the public cloud 104 and the on-premises site 102 and the public cloud 106 through a cluster 138 of control plane routers 140A and 140N. The control plane routers 140A and 140N can manage the importing and exporting of routes into the on-premises site 102, the public cloud 106, the MSC 110, etc., in order to support interconnectivity between the public cloud 104, the on-premises site 102, and the public cloud 106. In some implementations, the control plane routers 140A and 140N can import and export routes using EVPN (Ethernet Virtual Private Network) BGP (border gateway protocol). The control plane routers 140A and 140N can establish BGP sessions with the on-premises site 102, the public cloud 106, and/or the MSC 110 to exchange routes.

The control plane routers 140A and 140N can include BGP speakers or agents for establishing BGP sessions. In some implementations, the control plane routers 140A and 140N support or implement two control plane sessions (e.g., BGP sessions) with every other site (e.g., on-premises site 102 and public cloud 106) for redundancy and intersite connectivity. In other implementations, the control plane routers 140A and 140N may support or implement more or less control plane sessions for every other site. For example, the control plane routers 140A and 140N may support or implement a single control plane session for one or more other site (e.g., on-premises site 102 and/or public cloud 106) or more than two control plane session for one or more other site (e.g., on-premises site 102 and/or public cloud 106).

The control plane routers 140A and 140N can include CSR routers, such as Cisco CSR1kV routers, and can be equipped with sufficient capacity to store and manage all the routes for the public cloud 104. Moreover, the control plane routers 140A and 140N can support or implement internal control plane sessions (e.g., BGP sessions) with a cluster 150 of data plane routers 152A, 152B, 152N and/or routers 156, 162, 166 on the VPCs 154A, 154B, 154N, to exchange and manage routing information for the public cloud 104. In some cases, the control plane routers 140A and/or 140N can also double up as data plane routers. For example, the control plane routers 140A and/or 140N can double up as data plane routers in addition to, or in lieu of, other data plane routers (e.g., 152A, 152B, 152N).

In some cases, as further described below, the data plane routers 152A, 152B, 152N can be mapped or designated to a specific subset of VPCs 154A, 154B, 154N in order to distribute data plane routing functionalities and responsibilities for traffic to and from the VPCs 154A, 154B, 154N amongst the data plane routers 152A, 152B, 152N. Here, the control plane routers 140A and 140N can manage the distribution of internal routes to map the data plane routers 152A, 154B, 152N to respective VPCs 154A, 154B, 154N and/or distribute the routing functionalities and responsibilities accordingly.

Moreover, the cloud controller 114 in the public cloud 104 can communicate with MSC 110, controller 112 in the on-premises site, and cloud controller 116 on the public cloud 106 to coordinate and manage the exchange and/or translation of policies between the on-premises site 102, the public cloud 104, and the public cloud 106, as well as the implementation of such policies in the public cloud 104. For example, the cloud controller 114 can communicate with MSC 110 to map or translate EPGs 130, 132, 134 (and associated policies) in the on-premises site 102 to the security groups 160A, 160B, 160N in the public cloud 104, map or translate the VRFs 136A, 136B, 136N in the on-premises site 102 to the VPCs 154A, 154B, 154N in the public cloud 104, and/or map or translate any other policy constructs or objects in the on-premises site 102 to the public cloud 104.

As previously mentioned, the multi-cloud fabric 100 can include one or more additional public clouds, such as public cloud 106, which can implement a different policy model, environment, and/or cloud or datacenter solution as public cloud 104 and/or on-premises site 102 and which may have different requirements or limitations than public cloud 104 and/or on-premises site 102. For example, in some aspects, the on-premises site 102 may implement Cisco's ACI solution, while the public cloud 104 implements a different cloud solution, such as Amazon's AWS, and the public cloud 106 implements yet a different cloud solution, such as Microsoft's Azure or Oracle Cloud.

In the illustrative example in FIGS. 1A and 1B, the public cloud 106 can include virtual networks (VNETs) 178A, 178B, and 178N, which represent private networks on the public cloud 106 and which can be interconnected with the on-premises site 102 and the public cloud 104 as described herein. Like the VRFs 136A, 136B, and 136N and the VPCs 154A, 154B, and 154N, the VNETs 178A, 178B, and 178N can function as private virtual networks with specific address spaces, with each virtual network being isolated from other virtual networks and with each virtual network hosting respective applications, resources, devices, etc., and having specific security and routing policies. For example, the VNETs 178A, 178B, and 178N can host applications and resources on the public cloud 106 for use by the on-premises site 102 and/or the public cloud 104. In some cases, the VNETs 178A, 178B, and 178N can represent or map to VRFs (e.g., 136A, 136B, 136N) on the on-premises site 102.

The VNETs 178A, 178B, and 178N can include endpoints (EPs) 184, 188, and 192 on the public cloud 106. For example, VNET 178A can include EPs 184, VNET 178B can include EPs 188, and VNET 178N can include EPs 192. The EPs 184, 188, 192 can include virtual/logical and/or physical endpoints, such as VMs, software containers, physical servers, etc. The EPs 184, 188, 192 can be included in application security groups 180A, 180B, 180N, which are policy constructs implemented by the public cloud 106, and which can be translated to EPGs as described herein. The application security groups 180A, 180B, 180N can include one or more respective security policies defined for traffic matching one or more attributes associated with the application security groups 180A, 180B, 180N, such as IP addresses (e.g., the IP addresses of EPs 184, 188, 192 in the application security groups 180A, 180B, 180N), labels (e.g., VM labels or tags), EP attributes (e.g., VM names or characteristics), IP prefixes, etc.

Traffic to and from the VNETs 178A, 178B, and 178N can be routed via routers 182, 186, and 190, which can include virtual cloud routers, virtual private gateways or VPN gateways, CSR routers such as Cisco CSR1kV routers, and the like. The routers 182, 186, 190 can serve as the ingress and egress points of the VNETs 178A, 178B, and 178N, and can interconnect the VNETs 178A, 178B, and 178N with each other as well as other external devices or networks (e.g., on-premises site 102 and public cloud 104) through a cluster 174 of data plane routers 176A, 176B, 176N. The data plane routers 176A, 176B, 176N can include virtual cloud routers, virtual gateways, CSR routers such as Cisco CSR1kV routers, and the like.

The routers 182, 186, and 190 can provide interconnectivity between the public cloud 106, the on-premises site 102 and the public cloud 104 through a cluster 170 of control plane routers 172A and 172N. The control plane routers 172A and 172N can manage the importing and exporting of routes into the on-premises site 102, the public cloud 104, the MSC 110, etc., in order to support interconnectivity between the public cloud 106, the on-premises site 102, and the public cloud 104. In some implementations, the control plane routers 172A and 172N can import and export routes using EVPN BGP. The control plane routers 172A and 172N can establish BGP sessions with the on-premises site 102, the public cloud 104, and/or the MSC 110 to exchange routes.

The control plane routers 172A and 172N can include BGP speakers or agents for establishing BGP sessions. In some implementations, the control plane routers 172A and 172N support or implement two control plane sessions (e.g., BGP sessions) with every other site (e.g., on-premises site 102 and public cloud 104) for redundancy and intersite connectivity. In other implementations, the control plane routers 172A and 172N may support or implement more or less control plane sessions for every other site. For example, the control plane routers 172A and 172N may support or implement a single control plane session for one or more other site (e.g., on-premises site 102 and/or public cloud 104) or more than two control plane session for one or more other site (e.g., on-premises site 102 and/or public cloud 104).

The control plane routers 172A and 172N can include CSR routers, such as Cisco CSR1kV routers, and can be equipped with sufficient capacity to store and manage all the routes for the public cloud 106. Moreover, the control plane routers 172A and 172N can support or implement internal control plane sessions (e.g., BGP sessions) with a cluster 174 of data plane routers 176A, 176B, 176N and/or routers 182, 186, 190 on the VNETs 178A, 178B, and 178N, to exchange and manage routing information for the public cloud 106. In some cases, the control plane routers 172A and/or 172N can also double up as data plane routers. For example, the control plane routers 172A and/or 172N can double up as data plane routers in addition to, or in lieu of, other data plane routers (e.g., 176A, 176B, 176N).

In some cases, as further described below, the data plane routers 176A, 176B, 176N can be mapped or designated to a specific subset of VNETs 178A, 178B, and 178N in order to distribute data plane routing functionalities and responsibilities for traffic to and from the VNETs 178A, 178B, and 178N amongst the data plane routers 176A, 176B, 176N. Here, the control plane routers 172A and 172N can manage the distribution of internal routes to map the data plane routers 176A, 176B, 176N to respective VNETs 178A, 178B, and 178N and/or distribute the routing functionalities and responsibilities accordingly.

Moreover, the cloud controller 116 in the public cloud 106 can communicate with MSC 110, controller 112 in the on-premises site, and cloud controller 114 on the public cloud 104 to coordinate and manage the exchange and/or translation of policies between the on-premises site 102, the public cloud 104, and the public cloud 106, as well as the implementation of such policies in the public cloud 106. For example, the cloud controller 116 can communicate with MSC 110 to map or translate EPGs 130, 132, 134 (and associated policies) in the on-premises site 102 to the application security groups 180A, 180B, 180N in the public cloud 106, map or translate the VRFs 136A, 136B, 136N in the on-premises site 102 to the VNETs 178A, 178B, and 178N in the public cloud 106, and/or map or translate any other policy constructs or objects in the on-premises site 102 to the public cloud 106.

The public cloud 104 and the public cloud 106 can implement a network overlay for data plane routing, such as VxLAN (Virtual Extensible LAN), and a control plane solution such as BGP or EVPN BGP for control plane functionality. For example, as previously described, the public cloud 104 and the public cloud 106 can implement various layers of BGP sessions for control plane functionality. Use of BGP or BGP EVPN with an overlay data plane solution such as VxLAN for inter-site sessions (e.g., sessions between the on-premises site 102, the public cloud 104, and/or the public cloud 106) can help provide a seamless extension of VRFs (e.g., 136A, 136B, 136N) or other routing domain or addressing constructs/schemes between sites (e.g., 102, 104, 106) using one or more BGP Sessions and carry data packets in a network (e.g., an IP network) without additional segment-specific configurations. The MSC 110 can map the local virtual or private network (e.g., VRFs, VPCs, VNETs) segment identifiers (IDs) between the on-premises site 102 and the public clouds 104, 106 and/or between the public clouds 104, 106, and can manage the route import and export into the corresponding virtual or private networks (e.g., VRFs, VPCs, VNETs) through mapping of BGP or BGP EVPN route targets. This strategy can establish a common routing and forwarding plane the on-premises site 102 and the public clouds 104, 106.

In one illustrative example, the public cloud 104 and the public cloud 106 can implement three layers of BGP sessions for control plane functionality. To illustrate, the public cloud 104 can implement a first layer of BGP sessions including one or more external control plane sessions (e.g., BGP sessions) with the MSC 110, the on-premises site 102, and/or the public cloud 106; a second layer of BGP sessions including one or more control plane sessions (e.g., BGP sessions) between the control plane routers 140A and 140N and the data plane routers 152A, 152B, 152N; and a third layer of BGP sessions including one or more control plane sessions (e.g., BGP sessions) between the data plane routers 152A, 152B, 152N and the routers 156, 162, 166 in the VPCs 154A, 154B, and 154N. Similarly, the public cloud 106 can implement a first layer of BGP sessions including one or more external control plane sessions (e.g., BGP sessions) with the MSC 110, the on-premises site 102, and/or the public cloud 104; a second layer of BGP sessions including one or more control plane sessions (e.g., BGP sessions) between the control plane routers 172A and 172N and the data plane routers 176A, 176B, 176N; and a third layer of BGP sessions including one or more control plane sessions (e.g., BGP sessions) between the data plane routers 176A, 176B, 176N and the routers 182, 186, 190 in the VNETs 178A, 178B, and 178N.

In this example, the three layers of BGP sessions can help achieve the following non-limiting example benefits. First, the three layers of BGP sessions can allow the multi-cloud fabric 100 to use a common private and/or virtual network (e.g., VRF, VPC, or VNET) for inter-site connectivity instead of providing inter-site connectivity from individual private and/or virtual networks such as individual VRFs. This can provide an economical solution that is operationally easy to manage.

Second, while some examples implement only a few, such as two, BGP sessions for control plane redundancy, multiple data plane routers can be implemented to cater to a larger VRF scale of the on-premises site 102 and the bandwidth needs of the public clouds 104, 106. Accordingly, when BGP routes are advertised from the public cloud 104 or the public cloud 106, multiple next hops belonging to multiple data plane routers can be implemented in a distributed fashion based on the VRFs 136A, 136B, 136N, the bandwidth needs of a VRF (e.g., 136A, 136B, or 136N), and/or routes per VRF (e.g., 136A, 136B, or 136N). This can be achieved through the second layer of BGP sessions within a common VRF (or any other private and/or virtual network such as a VPC or VNET) on the multi-cloud fabric 100 between the control plane routers and the data plane routers.

Third, by combining the features of the first and second layers of BGP sessions, the public clouds 104 and 106 can match the scale of the combined fabric of the on-premises site 102 and the public clouds 104 and 106, as the number of sites grows, as the number of PODs per site grows, and/or as the number of VRFs that are stretched across sites and/or their bandwidth grows.

Figure 2A:
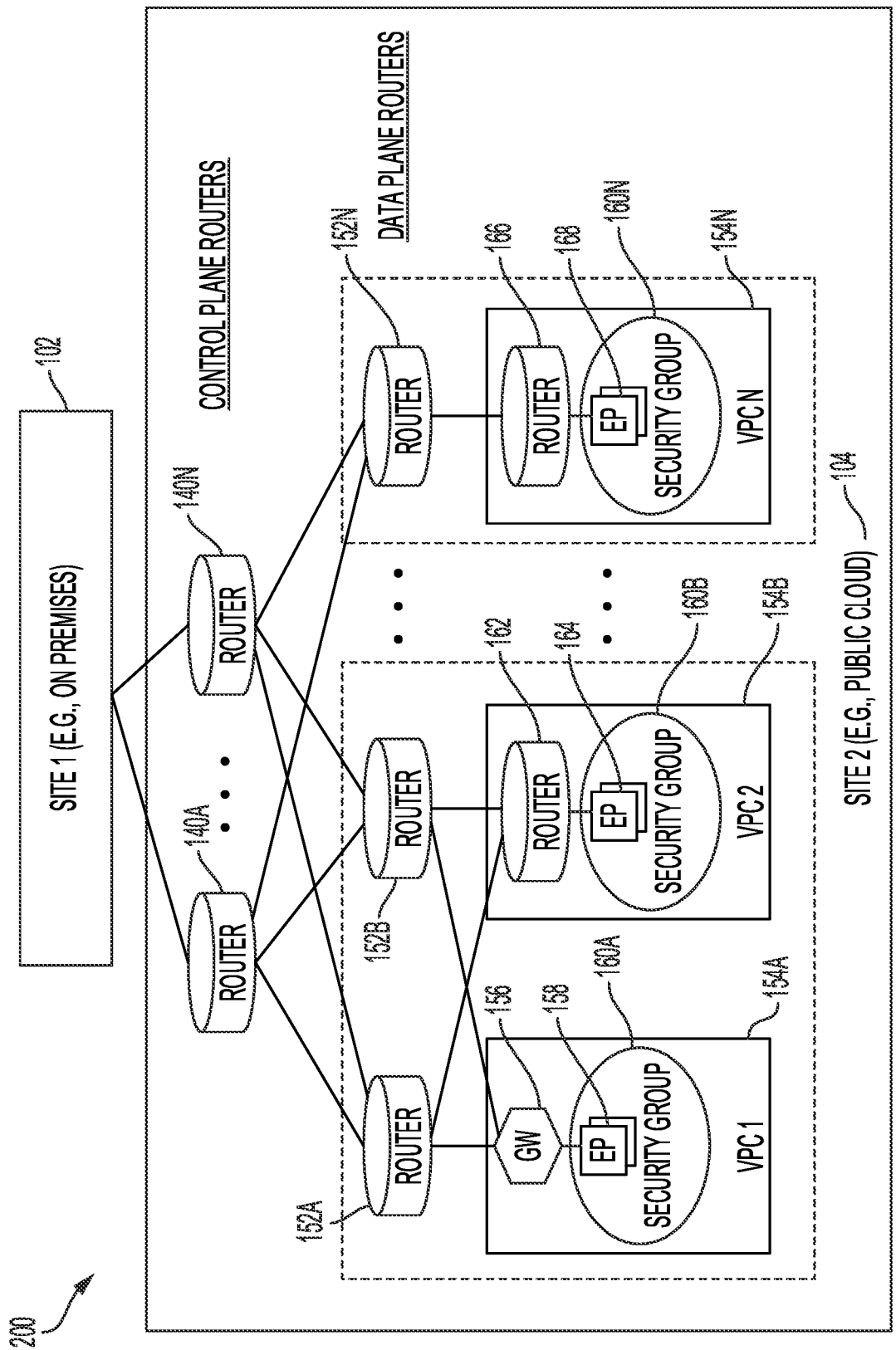
FIGS. 2A and 2B illustrate example configurations for distributing the data plane functionalities for traffic in an example public cloud between data plane routers in the public cloud.

FIG. 2A illustrates an example configuration 200 for distributing the data plane functionalities for traffic in an example public cloud (e.g., 104) between data plane routers (e.g., 152A, 152B, 152N) in the example public cloud. In this example, the configuration 200 is described with respect to public cloud 104. However, similar techniques can be implemented in other cloud sites, such as public cloud 106.

In configuration 200, data plane routers 152A and 152B are assigned to VPC 154A and VPC 154B, and data plane router 152N is assigned to VPC 154N. Thus, the routing of data traffic to and from VPC 154A and VPC 154B is handled by data plane routers 152A and 152B, and the routing of data traffic to and from VPC 154N is handled by data plane router 152N. To ensure that data traffic associated with VPC 154A and VPC 154B is handled by data plane routers 152A and 152B and data traffic associated with VPC 154N is handled by data plane router 152N, the control plane routers 140A and 140N can tailor route advertisements (e.g., via BGP sessions) to ensure data traffic associated with VPC 154A and VPC 154B is handled by data plane routers 152A and/or 152B and data traffic associated with VPC 154N is handled by data plane router 152N. For example, the route advertisements provided by the control plane routers 140A and 140N can map data plane routers 152A and 152B to VPC 154A and VPC 154B (or traffic associated with VPC 154A and VPC 154B), and data plane router 152N to VPC 154N (or traffic associated with VPC 154N).

Such distributed data plane routing techniques can help adapt the data plane routing in the public cloud 104 to specific bandwidth and other service requirements, and elastically scale bandwidth and routing capabilities. Moreover, such distributed data plane routing techniques can help dynamically increase or decrease data plane routing capabilities in the public cloud 104 to accommodate current and/or future conditions. For example, when additional bandwidth is necessary or desired to handle data plane traffic in the public cloud 104, one or more data plane cloud routers can be dynamically deployed on the public cloud 104 to handle such traffic. The control plane routers 140A and 140N can then map or assign the newly-deployed one or more data plane cloud routers to one or more VPCs through route advertisements, to ensure that data traffic associated with the one or more VPCs is handled by the newly-deployed one or more data plane cloud routers. In some aspects, the control plane routers 140A and 140N can communicate the addresses associated with the one or more VPCs (e.g., IP addresses or prefixes associated with the one or more VPCs, endpoints in the one or more VPCs, cloud routers in the one or more VPCs, and/or other resources in the one or more VPCs) to other sites (e.g., on-premises site 102 and public cloud 106) through Next-Hop change attributes provided in BGP EVPN sessions.

For example, the data plane routing techniques herein can allow the public cloud 104 (or any other site) dynamically grow the capacity of the forwarding plane (e.g., control plane routers 140A and 140N) to accommodate an increase in bandwidth needs in the public cloud 104, as well as the addition of resources or objects in the public cloud 104, such as endpoints, private cloud networks (e.g., VPCs), etc., while maintaining a small number of control plane sessions for redundancy. In some examples, the cluster 138 of control plane routers 140A and 140N can provide an anycast address for a group of resources or objects, such as endpoints, VPCs, cloud routers, etc., and communicate the anycast address to other sites (e.g., on-premises site 102, public cloud 106) through a Next-Hop change in one or more BGP EVPN sessions. Moreover, the control plane routers 140A and 140N can manage the control plane scale and reduce the control plane burden on the data plane routers 152A, 152B, 152N.

Figure 2B:
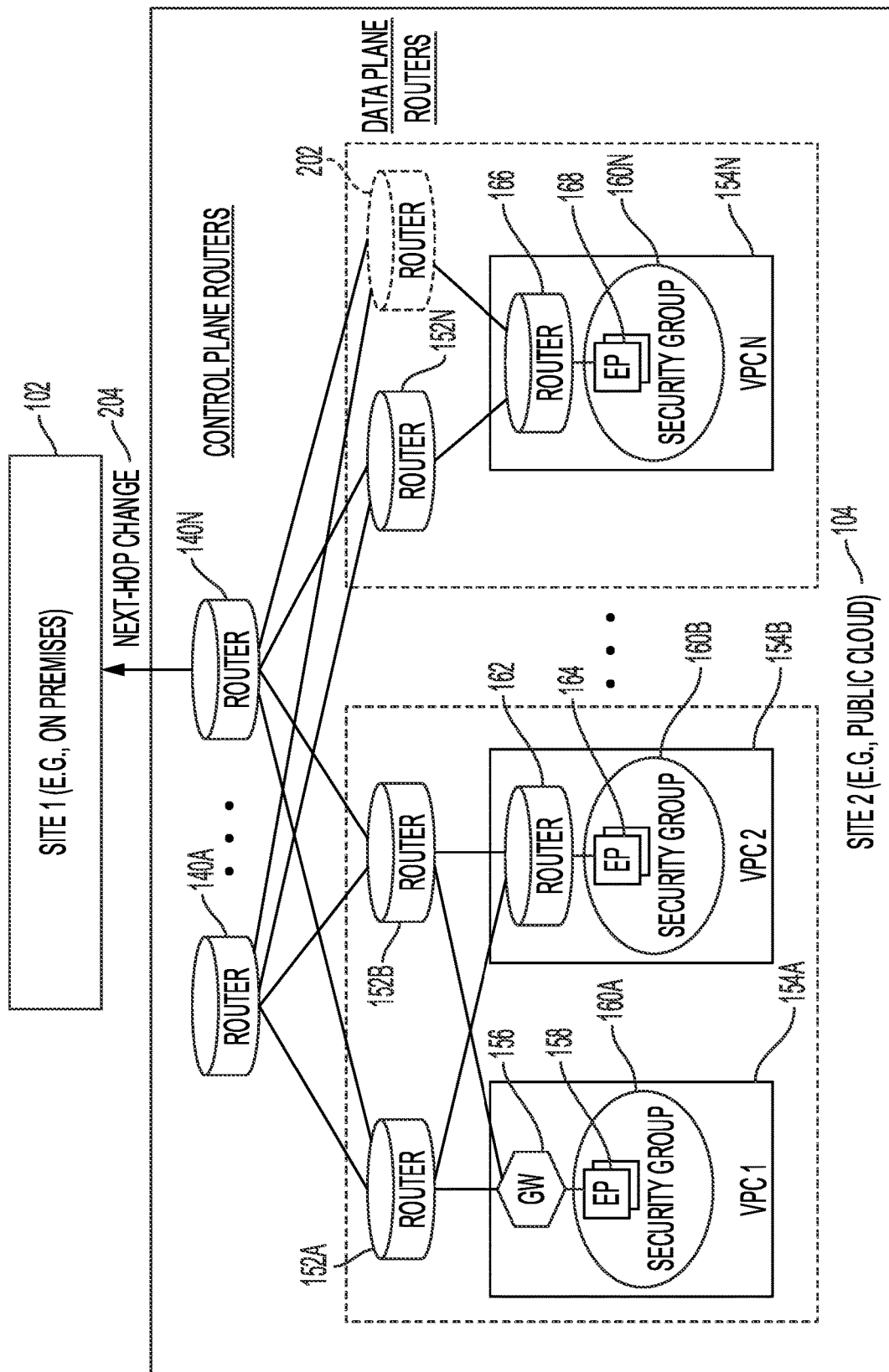

To illustrate, with reference to FIG. 2B, a new data plane router 202 can be dynamically deployed on the public cloud 104 to accommodate an increase in traffic or bandwidth needs for VPC 154N. The new data plane router 202 can be, for example, a virtual or physical cloud router or gateway, such as a virtual gateway (vGW) or a CSR router. Moreover, the new data plane router 202 can be assigned to handle data traffic associated with VPC 154N, in order to accommodate the increase in traffic or bandwidth needs for VPC 154N.

In some cases, this can be accomplished through a Next-Hop change 204 communicated by control plane router 140N to the on-premises site 102 (and/or MSC 110). For example, to communicate the address of the new data plane router 202 to the on-premises site 102 and change the next hop for traffic associated with VPC 154N to include the new data plane router 202, the control plane router 140N can establish a BGP session with the on-premises site 102 and send an update message to the on-premises site 102. The update message can include a Next-Hop attribute identifying the address of the new data plane router 202 as a next hop to destinations in the VPC 154N. The update message can cause one or more BGP speakers on the on-premises site 102 to receive the Next-Hop change 204 and update BGP routes (e.g., populate one or more BGP tables with the new BGP route including the address of the new data plane router 202) associated with VPC 154N on the public cloud 104.

In another example, if a new VPC is deployed on the public cloud 104, one or more data plane routers can be dynamically deployed on the public cloud 104 to handle data traffic associated with the new VPC. The control plane router 140A and/or 140N can similarly perform a Next-Hop change to communicate to the on-premises site 102 one or more BGP routes associated with the new VPC which can identify the one or more data plane routers as a next hop to destinations in the new VPC.

Figure 3:
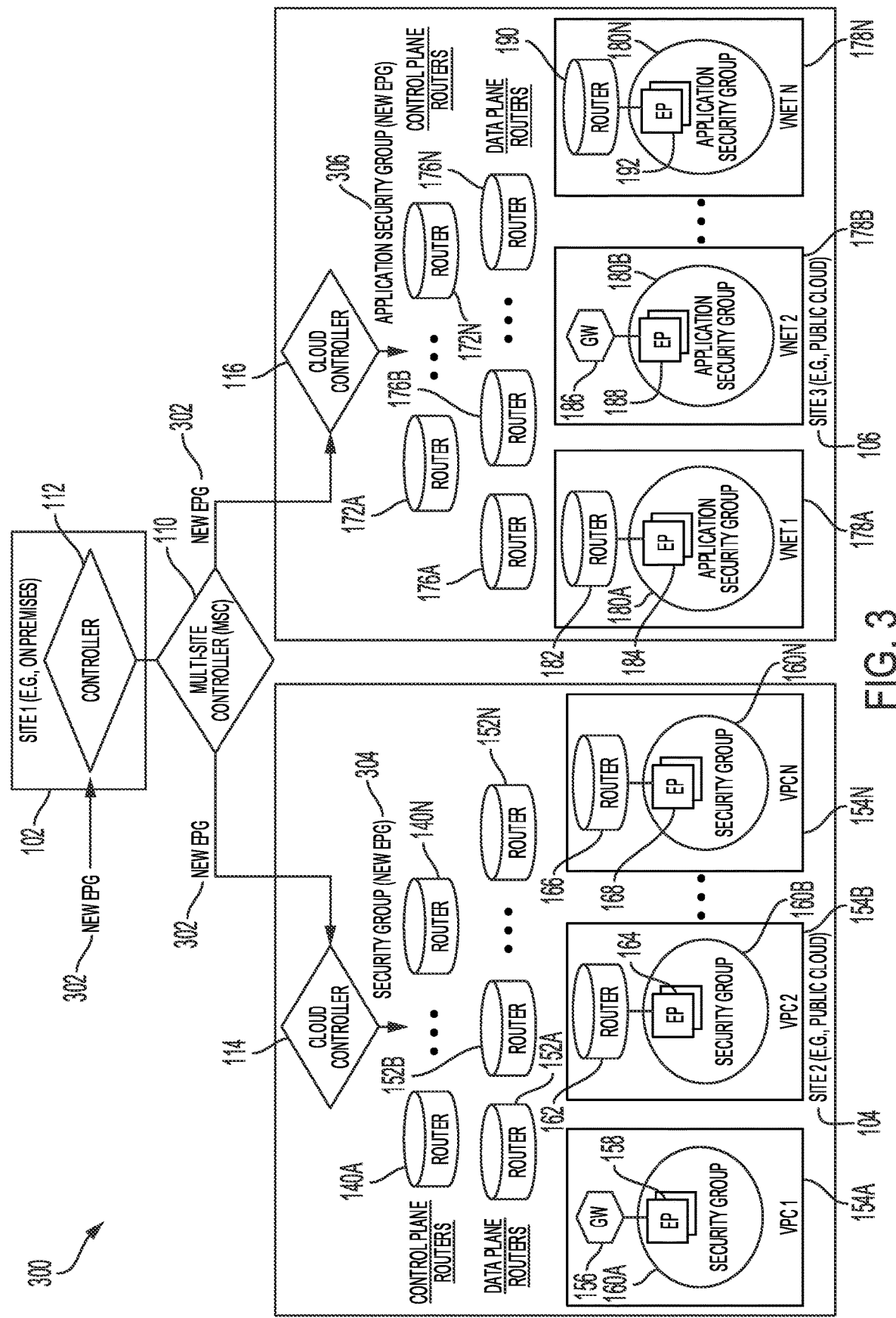
FIG. 3 illustrates an example policy normalization use case in the multi-cloud fabric.

FIG. 3 illustrates an example policy normalization use case 300 in the multi-cloud fabric 100. In this example, a new EPG 302 is configured on the on-premises site 102 and propagated to the fabric of the on-premises site 102 by controller 112. Routers or switches (e.g., 120, 122) in the on-premises site 102 can translate the new EPG 302 into ACL (access control list) rules which can be enforced by those routers or switches.

Since the public clouds 104 and 106 in this example do not support EPG policy constructs, the new EPG 302 can be translated into policy constructs supported by the public clouds 104 and 106 and implemented in the public clouds 104 and 106 as the translated policy constructs. For example, assume the public cloud 104 is an AWS cloud which supports security groups instead of EPGs, and public cloud 106 is an Azure cloud which supports application security groups or network security groups instead of EPGs. Thus, the MSC 110 can translate the new EPG 302 into security group 304 for the public cloud 104 and application security group 306 (or a network security group) for the public cloud 106. The MSC 110 can then propagate the security group 304 to the public cloud 104 and the application security group 306 to the public cloud 106.

The public cloud 104 can receive the security group 304 (e.g., via cloud controller 114) and implement the security group 304, which mirrors the new EPG 302 and normalizes its associated policies to accommodate the environment and requirements of the public cloud 104. Similarly, the public cloud 106 can receive the application security group 306 (e.g., via cloud controller 116) and implement the application security group 306, which also mirrors the new EPG 302 and normalizes its associated policies to accommodate the environment and requirements of the public cloud 106. In this way, the policies associated with the new EPG 302 can be extended to the public clouds 104 and 106 to provide a uniform policy view in the multi-cloud fabric 100, despite the public clouds 104 and 106 not supporting EPG policy constructs.

The security group 304 and the application security group 306 can reflect the policies in the new EPG 302. To match traffic to the security group 304 and the application security group 306 and thus apply the policies in the security group 304 and the application security group 306 to such traffic, the traffic can be classified and matched to the security group 304 and the application security group 306 based on one or more classification schemes. For example, in the on-premises site 102, traffic associated with the new EPG 302 can be classified by IP addresses, IP prefixes, or a combination of packet attributes such as port and VLANs. On the other hand, in the public clouds 104 and 106, traffic associated with the security group 304 and the application security group 306 (and consequently the new EPG 302) can be classified based on, for example, VM labels, IP addresses, endpoint attributes, tags (e.g., security group tags), etc.

With the policy normalization herein, inter-site traffic in the multi-cloud fabric 100 can be classified as belonging to the new EPG 302, the security group 304, or the application security group 306, and a consistent policy application based on the new EPG 302 can be applied to such traffic across the sites (102, 104, 106) in the multi-cloud fabric 100.

While FIG. 3 illustrates normalization of EPGs, it should be noted that normalization can be similarly performed for other policy constructs. For example, a VRF in the on-premises site 102 can be translated into a VPC for the public cloud 104 and a VNET for the public cloud 106, and the translated VPC and VNET can be respectively propagated and implemented at the public cloud 104 and the public cloud 106.

Moreover, any time an endpoint is discovered inside the on-premises site 102, the public cloud 104, or the public cloud 106, the same set of EPG Policies can be applied for traffic associated with that endpoint irrespective of what policy model and requirements are supported by the fabric where the endpoint resides. The same can be true when there is a contract policy between an EPG in the on-premises site 102 and another EPG (or security group or application security group) on any of the public clouds 104 and 106. This seamless policy deployment can be orchestrated by both the MSC 110 in conjunction with the controller 112 in the on-premises site 102 APIC and the cloud controllers 114 and 116 in the public clouds 104 and 106. The policy deployment can involve translating the details of the discovered endpoint to the various sites in the multi-cloud fabric 100 for local policy application for traffic between the discovered endpoint and other endpoints on different sites.

In many cloud environments, IP addresses can be used for classification and to achieve policy normalization. However, such IP-based policy normalization between sites (e.g., the on-premises site 102, the public cloud 104 and the public cloud 106) can be challenging since the endpoints can be discovered dynamically and the IP addresses can change over time. Hence, the classification of an EPG could change over time, making it difficult or even impossible to pre-provision such EPG policies via user configuration.

Figure 4A:
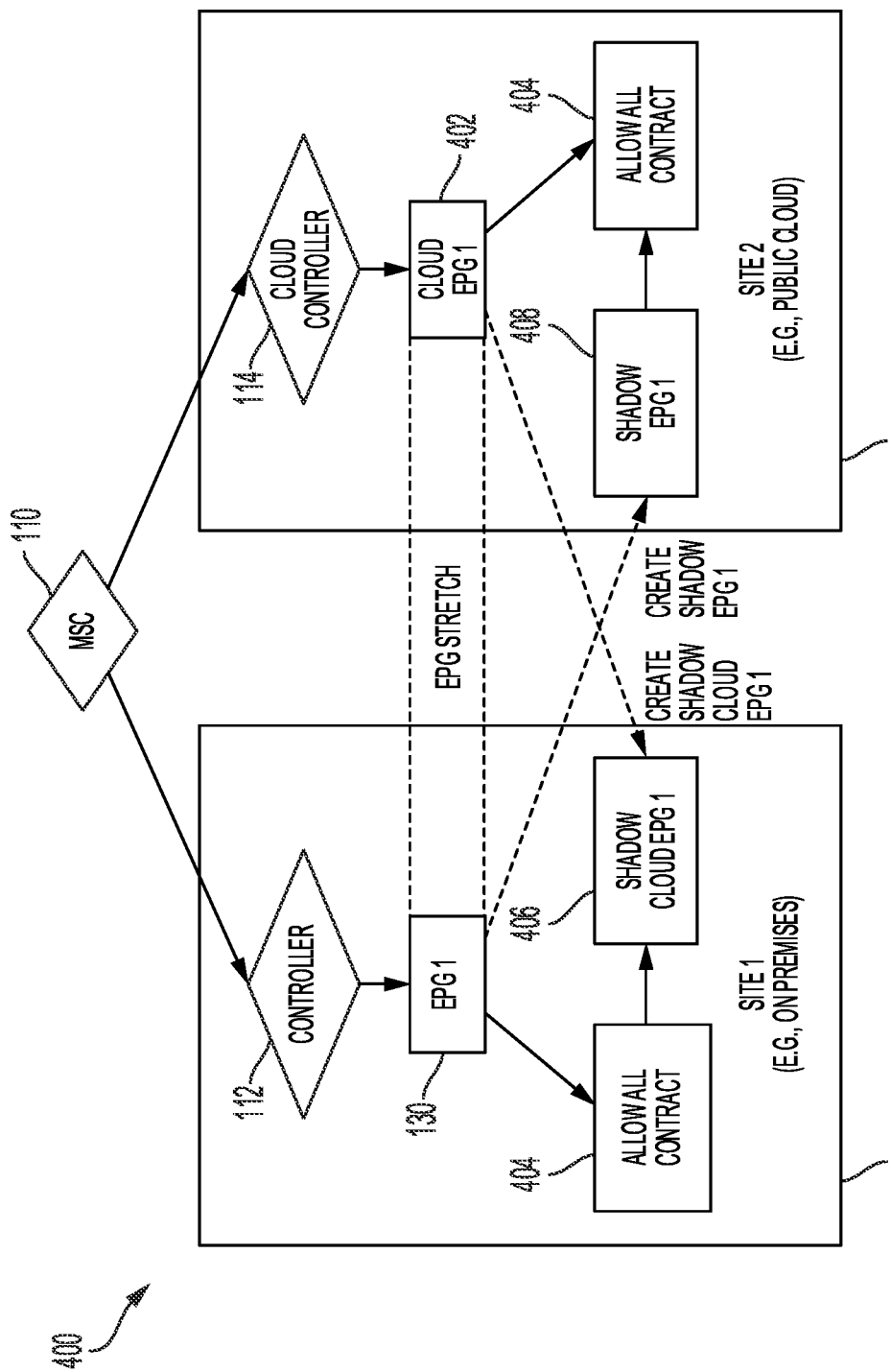
FIG. 4A illustrates a first example use case for policy normalization.
Figure 4B:
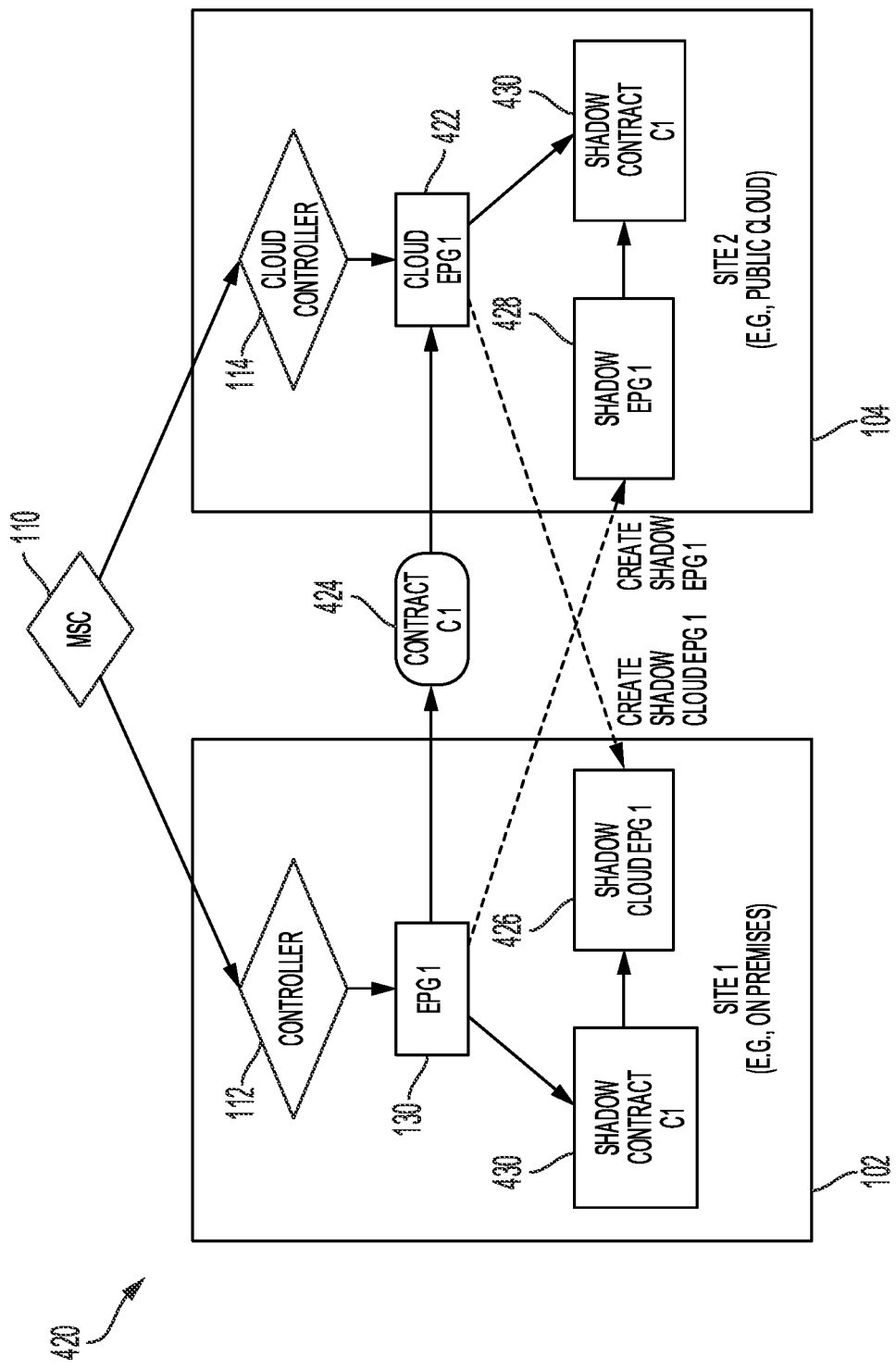
FIG. 4B illustrates a second example use case for policy normalization.

To address these challenges, various strategies can be implemented such as stretching EPGs across sites or mirroring EPGs and/or contracts across sites. FIGS. 4A and 4B illustrate different use case examples for policy normalization, including an example EPG-stretch use case 400 illustrated in FIG. 4A and an example EPG contract use case 420 illustrated in FIG. 4B.

With reference to FIG. 4A, in the example EPG-stretch use case 400, EPG 130 can be stretched between the on-premises site 102 and the public cloud 104 (and/or the public cloud 106), resulting in a cloud EPG 402 representing the stretched EPG 130. This means that the EPG 130 in the on-premises site 102 and the cloud EPG 402 in the public cloud 104 are one in the same. Traffic can flow between them without any contract establishment.

In order for a packet from an EP in the public cloud 104 to get classified as part of the cloud EPG 402, the MSC 110 can deploy a shadow cloud EPG 406, which shadows cloud EPG 402, in the on-premises site 102 and a shadow on-premises EPG 408, which shadows EPG 130, in the public cloud 104. The shadow cloud EPG 406 and shadow on-premises EPG 408 can describe the EP as an IP address, prefix, or subnet, for example. This information can be used by the on-premises site 102 to understand how to classify packets from the EP and determine which policies to apply to the packet. Since the EP's IP address may be dynamic, this IP information used to classify the EP as part of the stretched EPG can be exchanged between the on-premises site 102 and the public cloud 104 dynamically. This exchange can be orchestrated by the MSC 110, the controller 112, and the cloud controller 114 using, for example, a Kafka bus or the like.

The EP detection scheme can be local to the site where the EP resides. For example, in the on-premises site 102, the EP detection can be based on the data plane learning, while in the public cloud 104, the EP detection can be based on EP configuration events (e.g., VM configuration events) detected through a cloud native service such as AWS Config service in the case of AWS. The detected EP is then mapped to an EPG (e.g., EPG 130) and represented in a common object hierarchy. As changes are made to the hierarchy (e.g., EP join, leave, move, etc.), the changes can be reflected onto the other sites.

In the on-premises site 102, such EPs are represented by their corresponding EPG(s). In other sites (e.g., public clouds 104 and 106), such EPs can be represented as External (or) L3Out EPGs (in Cisco's ACI terminology) or the like. Accordingly, in the EPG-stretch use case 400, policy normalization can be accomplished by stretching the EPG 130 to the public cloud 104 and creating shadow EPGs (e.g., 406 and 408) in the on-premises site 102 and the public cloud 104. An allow all contract 404 can also be configured for traffic corresponding to the stretched EPG (e.g., 130 and 402) and the shadow EPGs (e.g., 406 and 408). Together, the allow all contract 404, the stretched EPG (e.g., 130 and 402) and the shadow EPGs (e.g., 406 and 408) can enable policy normalization across the sites 102 and 104. The dynamic exchange of IP information between the sites can enable IP-based normalization even with dynamic or changing IP addresses.

While the EPG-stretch use case 400 is illustrated only between the on-premises site 102 and the public cloud 104, it should be noted that the same principles can be implemented to stretch EPGs onto any other sites in the multi-cloud fabric 100, such as the public cloud 106, and normalize policies across all sites in the multi-cloud fabric 100.

FIG. 4B illustrates an example EPG contract use case 420 for policy normalization. In this example, two independent EPGs are implemented in the on-premises site 102 and the public cloud 104: EPG 130 is implemented in the on-premises site 102 and cloud EPG 422 is implemented in the public cloud 104. The EPG 130 and cloud EPG 422 are implemented with a contract 424 between them.

When there is a contract between the two EPGs in different sites, the MSC 110 can create corresponding shadow or mirror EPGs on the different sites and can classify discovered EPs using IP addresses as previously explained. Accordingly, in this example, the MSC 110 can create a shadow cloud EPG 426 in the on-premises site 102 and a shadow on-premises EPG 428 in the public cloud 104. The shadow cloud EPG 426 can mirror cloud EPG 422 from the public cloud 104, and the shadow on-premises EPG 428 can mirror EPG 130 from the on-premises site 102.

The MSC 110 can also create shadow contracts 430 on the public cloud 104 and the on-premises site 102. The shadow contracts 430 can mirror contract 424 between the EPG 130 in the on-premises site 102 and cloud EPG 422 in the public cloud 104. The on-premises site 102 and the public cloud 104 can apply the shadow contracts 430 to the shadow EPGs (e.g., 426 and 428). For example, when the on-premises site 102 receives traffic from an endpoint in the public cloud 104 which matches the shadow cloud EPG 426, the on-premises site 102 can apply the shadow cloud EPG 426 and contract 430 to the traffic. Similarly, when the public cloud 104 receives traffic from an endpoint in the on-premises site 102 which matches the shadow on-premises EPG 428, the public cloud 104 can apply the shadow on-premises EPG 426 and contract 430 to the traffic. In this way, the policies associated with EPG 130 in the on-premises site 102 are normalized across the on-premises site 102 and the public cloud 104. Such techniques can also be applied to normalize policies in the public cloud 106 and/or any other site, to obtain a uniform policy view or application across sites in the multi-cloud fabric 100.

As previously mentioned, cloud providers in many cases impose various resource limitations and policy restrictions which can limit the scale of resources and policies implemented in a hybrid environment such as the multi-cloud fabric 100. For example, the public cloud 104 and/or the public cloud 106 may have significant resource limitations and policy restrictions which can limit the deployment of policies from the on-premises site 102 across the multi-cloud fabric 100 to the public cloud 104 and the public cloud 106. To enable seamless policy extensions across the multi-cloud fabric 100, the technologies herein can implement strategies to match the policy scale across the sites (102, 104, 106) in the multi-cloud fabric 100. For example, if the on-premises site 102 supports a larger scale of policies than the public cloud 104 and the public cloud 106, the strategies herein can match the policy scale of the on-premises site 102 across the public cloud 104 and the public cloud 106.

To overcome such limitations or restrictions imposed by different cloud providers, an example scheme for policy scaling can be implemented which uses a combination of cloud native policy support and a cluster of custom policy-agent support in the public clouds 104 and 106. In some aspects, security policies can be deployed on cloud routers with cloud policy-agent support, such as CSR routers, and thereby overcome the various limitations imposed by cloud providers. The scale of such cloud routers can be significantly large, thus providing an increased scale across different cloud providers.

In some implementations, the policy constructs implemented by the on-premises site 102 (e.g., ACI policy constructs) can be translated into cloud native policies, such as security groups (e.g., 160A, 160B, 160N) in AWS (e.g., public cloud 104) and application or network security groups (e.g., 180A, 180B, 180N) in Azure (e.g., public cloud 106), as well as custom router policies (e.g., EPGs can be translated into Source Group Tags (SGTs) and contracts into ACLs in the cloud router).

Moreover, policies implemented in the public clouds 104 and 106 can be distributed for greater scalability across a cluster of cloud routers with cloud policy-agent support. The cluster of cloud routers can apply the policies to traffic associated with respective EPs or addressing spaces (e.g., VPCs, VNETs, etc.) assigned or mapped to the different cloud routers in the cluster.

Figure 5:
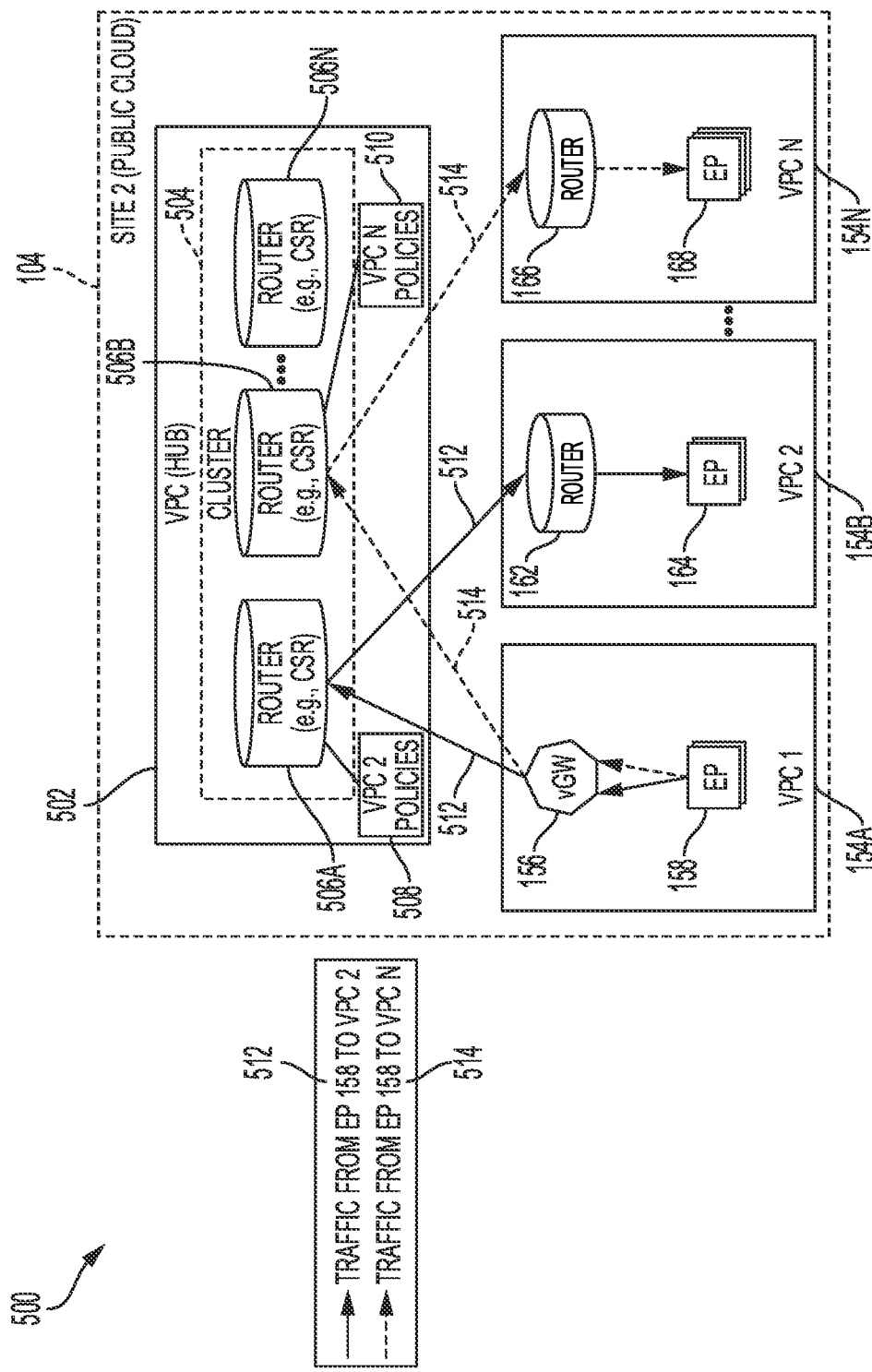
FIG. 5 illustrates an example distribution of policies in a cloud site for ensuring that the processing of traffic and implementation of policies in the cloud site are distributed across respective subsets of cloud routers in the cloud site.

FIG. 5 illustrates an example distribution 500 of policies to a cluster 504 of cloud routers 506A, 506B, 506N in the public cloud 104. The policies can be distributed across the cluster 504 of cloud routers 506A, 506B, 506N for scalability and/or to ensure that the processing of traffic in the public cloud 104 and the implementation of policies in the public cloud 104 are distributed across respective subsets of cloud routers. For example, respective subsets of the policies can be distributed to respective subsets of the cloud routers 506A, 506B, 506N to reduce the overall amount of policies implemented by each of cloud routers 506A, 506B, 506N, and thereby increase the overall amount of policies that can be implemented across the cluster 504 of cloud routers 506A, 506B, 506N. Moreover, the respective subsets of the cloud routers 506A, 506B, 506N can be configured to store routing entries for destinations (e.g., endpoints, VPCs, etc.) associated with the respective subsets of the policies and/or traffic associated with the respective subsets of the policies.

The cloud routers 506A, 506B, 506N can include any virtual or cloud routers, such as CSR1kV routers. In some cases, the cloud routers 506A, 506B, 506N can be the same routers (e.g., as opposed to separate routers) as the data plane routers 152A, 152B, 152N. In other words, the functionalities and behavior of the cloud routers 506A, 506B, 506N can be implemented in the data plane routers 152, 152, 152. In other cases, the cloud routers 506A, 506B, 506N can be separate routers implemented on the public cloud 104 in addition to, or in lieu of, the data plane routers 152A, 152B, 152N. Moreover, the cloud routers 506A, 506B, 506N can implement policy agents configured to apply policies as described herein. In some cases, the cloud routers 506A, 506B, 506N can be configured as part of a VPC 502 configured as a hub in a hub-and-spoke topology between VPC 502 and VPCs 154A, 154B, and 154N.

In this example, policies are distributed to specific cloud routers (506A, 506B, 506N) in the cluster 504 based on the destination VPC (154A, 154B, and/or 154N) associated with the policies. However, in other examples, distribution of routes can be performed based on other schemes. For example, routes can be distributed based on the source VPC, the source and destination VPCs, the source and/or destination VRFs, subnets, bandwidth, etc.

Based on the example scheme for distribution 500, the policies 508 associated with traffic having VPC 154B as its destination are implemented at the cloud router 506A. On the other hand, the policies 510 associated with traffic having VPC 154N as its destination are implemented at the cloud router 506B. Accordingly, only a particular cloud router—or subset of cloud routers—in the cluster 504 may implement the policies for a given traffic. This results in increased scalability as each set of policies does not have to be installed or implemented on all cloud routers (506A, 506B, 506N) in the cluster 504.

With this design, the combination of cloud routers 506A, 506B, 506N in cluster 504 can become a virtual entity that has n policy agents in its cluster (e.g., 504) capable of applying policies across endpoints (e.g., EPs 158, 164, 168) in the public cloud 104. The cluster 504 can grow and shrink in size as, and when, necessary by adding or removing policy agents (e.g., cloud routers).

However, if only a subset of the cloud routers 506A, 506B, 506N in the cluster 504 have the necessary policies for a given traffic, traffic will need to be routed accordingly to pass through the appropriate cloud router. While all of the policy agents (e.g., cloud routers 506A, 506B, 506N) may have the routes to get to all possible destinations, each policy agent may only advertise a specific set of routes based on what policies are carried by the policy agent. This can be achieved by using route control using, for example, BGP (Border Gateway Protocol) route maps, as further described below with reference to FIG. 6.

Thus, when virtual gateway 156 on VPC 154A receives flow 512 from endpoint 158 on VPC 154A to endpoint 164 on VPC 154B, virtual gateway 156 will send the flow 512 to cloud router 506A on VPC 502, which contains the policies for traffic destined to VPC 154B. The cloud router 506A receives the flow 512 and applies to the flow 512 one or more policies from the policies 508 for traffic destined to VPC 154B. The cloud router 506A thus obtains the flow 512 and applies the necessary policies to flow 512, before sending the flow 512 to cloud router 162 on VPC 154B. In some cases, the cloud router 506A can identify which specific policies from the policies 508 correspond to flow 512 based on an SGT or IP address in flow 512 that is mapped to the endpoint 164 on VPC 154B.

On the other hand, when virtual gateway 156 on VPC 154A receives flow 514 from endpoint 158 on VPC 154A to endpoint 168 on VPC 154C, virtual gateway 156 will send the flow 514 to cloud router 506B on VPC 502, which contains the policies for traffic destined to VPC 154C. The cloud router 506B receives the flow 514 and applies one or more policies from the policies 510 for traffic destined to VPC 154C. The cloud router 506B thus obtains the flow 514 and applies the necessary policies to flow 514, before sending the flow 514 to cloud router 166 on VPC 154C. In some cases, the cloud router 506B can identify the specific policies that correspond to flow 514 based on an SGT or IP address in flow 514 that is mapped to the endpoint 168 on VPC 154C.

Figure 6:
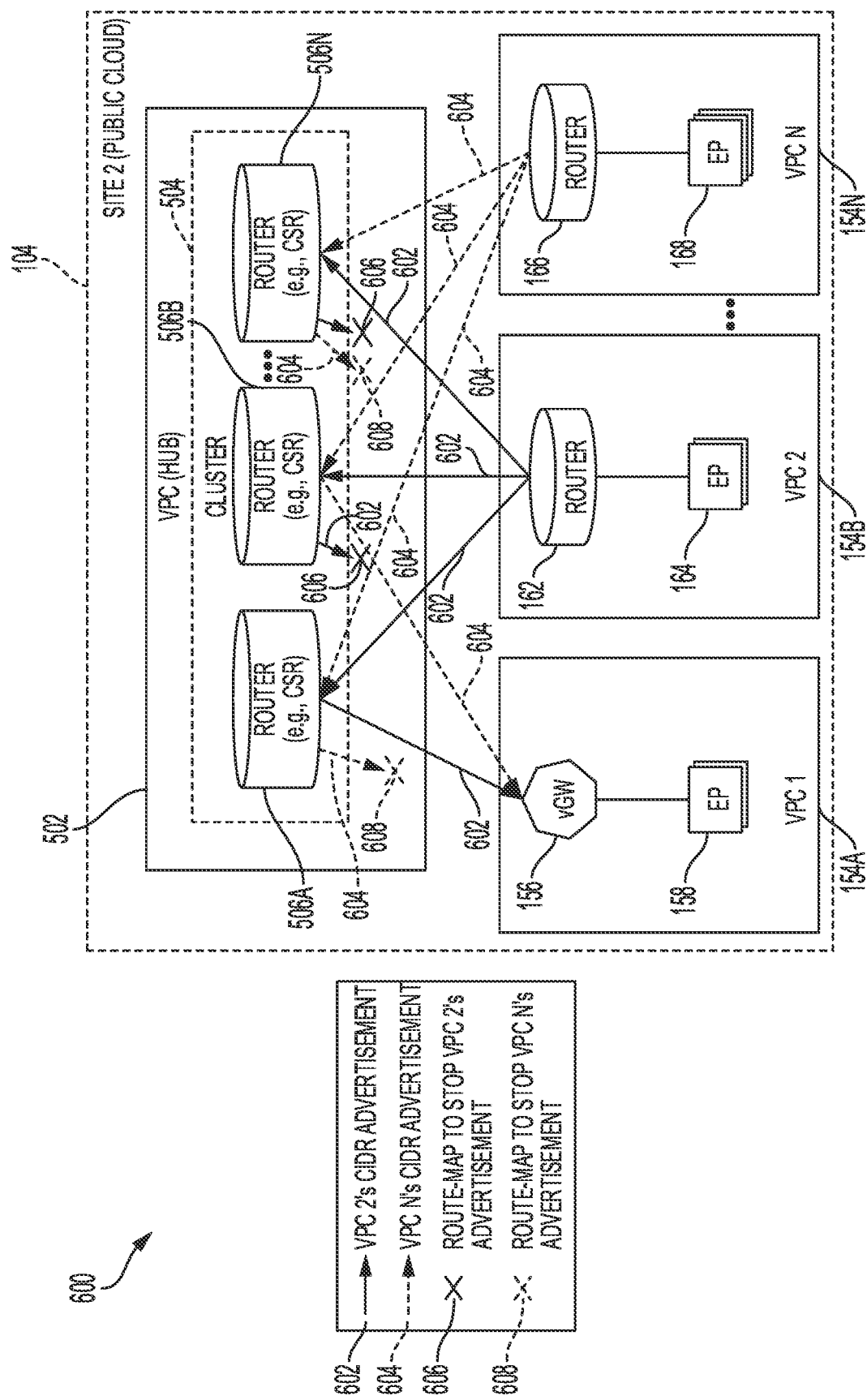
FIG. 6 illustrates an example scheme for aggregating routes in a cloud site to scale security rules implemented at endpoints in the cloud site.

FIG. 6 illustrates an example route distribution 600 by cloud routers 506A, 506B, 506N in the cluster 504 for ensuring that traffic is processed by the appropriate cloud router (e.g., policy agent) in the cluster 504 containing the policies for that traffic. In this example, advertisement 602 represents advertisements (e.g., via BGP) of VPC 154B's CIDR (Classless Inter-Domain Routing), and advertisement 604 represents advertisements (e.g., via BGP) of VPC 154N's CIDR. Route map 606 represents a route map for stopping advertisement 602 of VPC 154B's CIDR, and route map 608 represents a route map for stopping advertisement 604 of VPC 154N's CIDR. Route maps 606, 608 can essentially tell BGP to avoid advertising certain routes (e.g., VPC 154B's CIDR, VPC 154C's CIDR). This way, the route maps 606, 608 can prevent certain cloud routers 506A, 506B, 506N from sending certain BGP advertisements to the VPCs 154A, 154B, 154N (e.g., to routers 156, 162, 166) to ensure those VPCs do not send traffic for certain destinations to certain cloud routers (506A, 506B, 506N) that do not have policies for those destinations. Accordingly, with the route maps 606, 608, the cloud routers 506A, 506B, 506N can ensure that they only receive traffic from the VPCs (e.g., 154A, 154B, 154N) for which they have policies for.

In FIG. 6, the cloud router 506A carries policies for traffic destined to VPC 154B but does not carry policies for traffic destined to VPC 154N. Accordingly, cloud router 506A can send advertisement 602 to virtual gateway 156 on VPC 154A, advertising VPC 154B's CIDR to virtual gateway 156 so traffic sent from virtual gateway 156 to VPC 154B goes through cloud router 506A instead of cloud routers 506B or 506N. In addition, cloud router 506A implements route map 608 to stop cloud router 506A from advertising VPC 154N's CIDR. Advertisement 602 and route map 608 will thus ensure that cloud router 506A advertises VPC 154B's CIDR but does not advertise VPC 154N's CIDR in order to allow cloud router 506A to receive and process traffic to VPC 154B while ensuring that traffic to VPC 154N is not sent to cloud router 506A.

On the other hand, the cloud router 506B carries policies for traffic destined to VPC 154N but does not carry policies for traffic destined to VPC 154B. Accordingly, cloud router 506B can send advertisement 604 to virtual gateway 156 on VPC 154A, advertising VPC 154N's CIDR to virtual gateway 156 so traffic sent from virtual gateway 156 to VPC 154N goes through cloud router 506B instead of cloud routers 506A or 506N. In addition, cloud router 506B implements route map 606 to stop cloud router 506B from advertising VPC 154B's CIDR. Advertisement 604 and route map 606 will thus ensure that cloud router 506B advertises VPC 154N's CIDR but does not advertise VPC 154B's CIDR in order to allow cloud router 506B to receive and process traffic to VPC 154N while ensuring that traffic to VPC 154B is not sent to cloud router 506B.

The cloud router 506N does not carry policies for traffic destined to VPC 154B or VPC 154N. Accordingly, cloud router 506N does not send advertisements 602 or 604 to any of the VPCs 154A, 154B, 154N (or routers 156, 162, 166). To this end, cloud router 506N can implement both route map 606 and route map 608 to prevent cloud router 506N from sending advertisements 602 or 604 for VPC 154B's CIDR and VPC 154N's CIDR.

As illustrated above, using advertisements 602 and 604 and route maps 606 and 608 allows policies to be distributed across the cloud routers 506A, 506B, 506N in the cluster 504 while ensuring that traffic from the VPCs 154A-N is routed through the cloud router or subset of cloud routers in the cluster 504 that carry the policies for that traffic.

Once the routes are pruned as described above, this will ensure that the traffic will hit the designated cloud router or subset of cloud routers that serves the destination VPC of that traffic. Therefore, the policies that are associated with a pair of entities, such as two VPCs (or) two EPGs, can be programmed in two cloud routers (e.g., policy agents), for example, with each serving one of the destination VPCs or EPGs.

Note that traffic from one VPC can hit any of the cloud routers 506A, 506B, 506N depending on the destination VPC. In order to allow source routing checks, all the cloud routers 506A, 506B, 506N can learn the routes, although only one (or a subset) cloud router may distribute a given route to other VPCs. Source routing checks are useful for preventing rogue endpoints within a VPC from talking across. This provides the flexibility of applying certain policies only on the egress interface of the cloud router. In some scenarios, applying policies only on the egress interface helps increase scale. For example, to enable VPC 154A and VPC 154B to talk to VPC 154N on port 443, 2 rules are necessary if applied on the ingress tunnel interfaces, while only one rule is necessary if applied on the egress interface. Moreover, without source route checks, a VPC subnet S1, which in this example is a shared subnet, can be allowed to talk across VPCs, while subnet S2, which in this example is strictly private, cannot be allowed to talk across to other VPCs.

As illustrated herein, these approaches allow policies to be scaled elastically on the cloud routers 506A, 506B, 506N in the cluster 504, thereby bypassing native cloud resource limitations, such as AWS' 250-rule limit. Moreover, in addition to the foregoing, for greater security, certain security policies can also be implemented at the endpoints 158, 164, 168 on the public cloud 104. This can provide a whitelist policy model for endpoint communications within a VPC (e.g., VPC 154A, VPC 154B, VPC 154N) where an external cloud router may not be used, in order to prevent rogue traffic coming from other endpoints within the VPC, from the Internet or from other VPCs. A security model in the cloud of providing security policies at the host instance is a granular security approach in terms of endpoint protection and should not be compromised. The following proposed scheme can achieve this with minimal addition to the number of rules at the endpoint, while providing the scale through the cloud routers 506A, 506B, 506N.

The security rules at the endpoints 158, 164, 168 can handle security group (e.g., 160A, 160B, 160N) rules for traffic within the VPC's CIDR (i.e., traffic that does not hit the hub VPC 502), and a minimum set of IP rules for traffic coming from outside the VPC from the cloud router in the cluster 504. These rules can be based on one or more route-aggregation schemes. With the whitelist model, without these rules, traffic from outside the VPC may be dropped. At the same time, more granular policies are not necessary, as these can be applied in the cloud router that is in the path of the traffic towards the endpoint.

Figure 7:
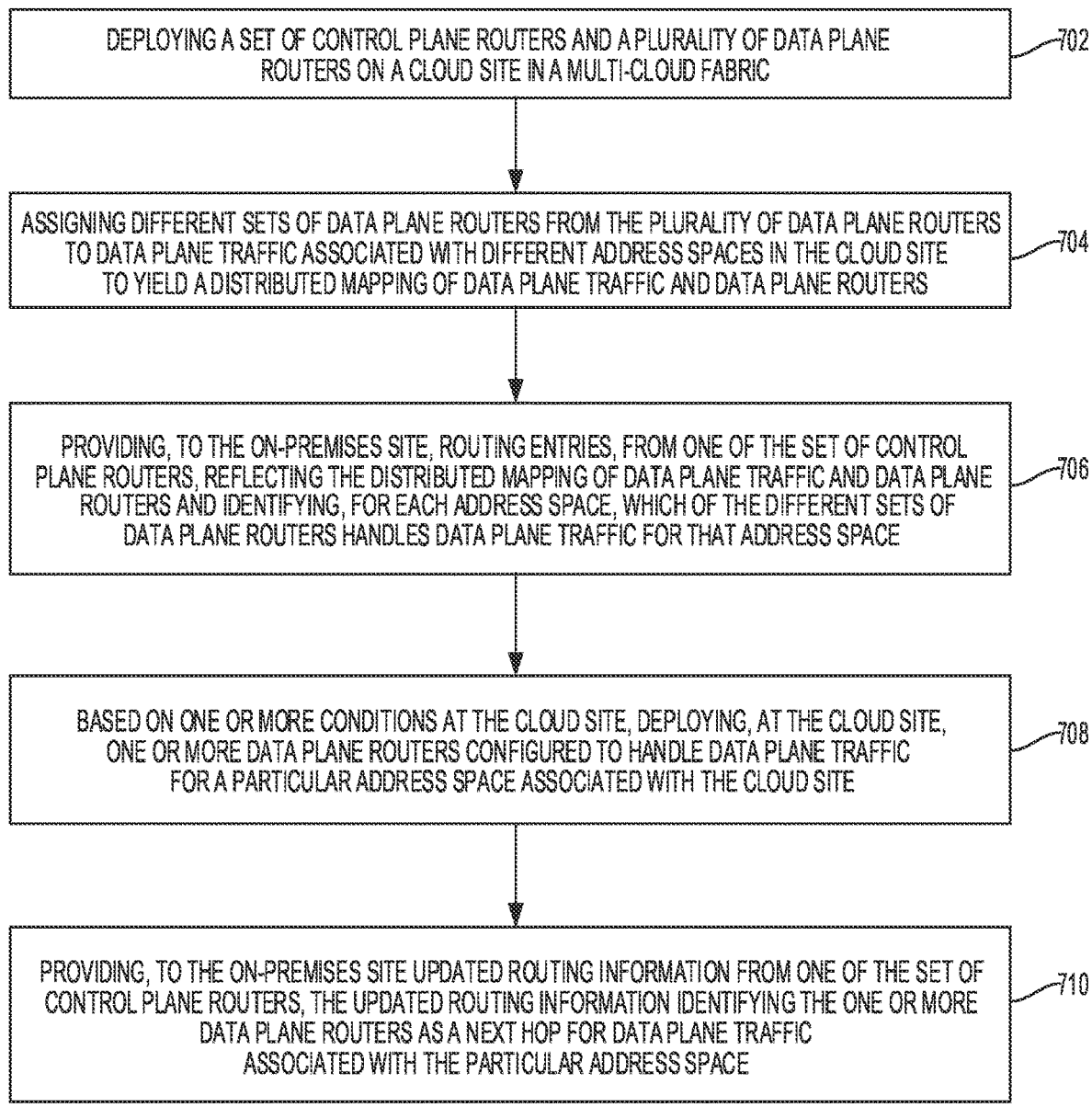
FIG. 7 illustrates an example method for elastic policy scaling and integration in multi-cloud fabrics.

Having described example systems and concepts, the disclosure now turns to the method illustrated in FIG. 7. The steps outlined herein are examples and can be implemented in any combination thereof, including combinations that exclude, add, or modify certain steps.

At step 702, the method can include deploying a set of control plane routers (e.g., 140A, 140N) and a plurality of data plane routers (e.g., 152A, 152B, 152N) on a cloud site (e.g., 104) in a multi-cloud fabric (e.g., 100). The multi-cloud fabric (e.g., 104) can include an on-premises site (e.g., 102) and one or more cloud sites (e.g., 104, 106) as shown in FIGS. 1A and 1B. The plurality of data plane routers (e.g., 152A, 152B, 152N) can be configured to handle data plane traffic associated with the cloud site (e.g., 104). Moreover, the set of control plane routers (e.g., 140A, 140N) can be configured to handle control plane traffic associated with the cloud site (e.g., 104) and exchange routing information with the on-premises site (e.g., 102). The routing information can include control plane data such as routes, route or hop changes (e.g., 204), BGP or EVPN BGP data, etc.

In some cases, the set of control plane routers (e.g., 140A, 140N) can include multiple control plane routers for each remote site (e.g., 102, 106). For example, in some implementations, the set of control plane routers (e.g., 140A, 140N) can include two control plane routers for each remote site. The multiple (e.g., two or more) control plane routers can provide control plane redundancy and can be used to establish control plane sessions (e.g., BGP sessions) with the remote sites (e.g., 102, 106) and/or network devices in the multi-cloud fabric (e.g., 100), such as fabric controllers (e.g., 110, 112, 114, 116) in the multi-cloud fabric, and exchange the routing information.

At step 704, the method can include assigning different sets of data plane routers from the plurality of data plane routers (e.g., 152A, 152B, 152N) to data plane traffic associated with different address spaces in the cloud site (e.g., 104) to yield a distributed mapping of data plane traffic and data plane routers. For example, different subsets (e.g., one or more) of the plurality of data plane routers (e.g., 152A, 152B, 152N) can be associated with, or configured to handle, data plane traffic associated with different address spaces (or routing devices in the different address spaces). The different address spaces can include, for example, different VPCs (e.g., 154A, 154B, 154N), different VNETs (e.g., 178A, 178B, 178N), different VRFs (e.g., 136A, 136B, 136N), different routing and forwarding or networking contexts, different private networks, different virtual networks, different subnets, different network segments or regions, etc.

Each of the different sets of data plane routers assigned to the data plane traffic associated with different address spaces (or to the different address spaces) can be configured to process the specific data plane traffic assigned to that particular set of data plane routers. For example, data plane router 152A may be assigned to VPC 154A and/or its associated data plane traffic, and configured to process the data plane traffic for VPC 154A. Similarly, data plane router 152B may be assigned to VPC 154B and/or its associated data plane traffic, and configured to process the data plane traffic for VPC 154B, and data plane router 152N may be assigned to VPC 154N and/or its associated data plane traffic, and configured to process the data plane traffic for VPC 154N. In this way, the processing of data plane traffic associated with VPCs 154A, 154B, and 154N is distributed across different data plane routers (e.g., 152A, 152B, 152N), thereby increasing scalability.

At step 706, the method can include providing, to the on-premises site (e.g., 102), routing entries from one of the set of control plane routers (e.g., 140A, 140N) reflecting (the routing entries) the distributed mapping of data plane traffic and data plane routers and identifying, for each address space, which of the different sets of data plane routers handles data plane traffic for that address space. For example, control plane router 140A may establish a control plane session, such as a BGP or EVPN BGP session, with the on-premises site (e.g., 102) and/or a cloud controller (e.g., controller 112 or multi-site cloud controller 110), to provide the routing entries to the on-premises site (e.g., 102). The routing entries can include routes for data plane traffic to the cloud site (e.g., 104). For example, the routing entries can include routes or hops for data plane traffic to VPCs 154A, 154B, 154N and/or networking devices configured to handle traffic associated with VPCs 154A, 154B, 154N, such as routers 156, 162, 166. In some cases, the routing entries can include other routing or control session information such as next hop changes or updates, BGP properties, etc.

At step 708, the method can include based on one or more conditions at the cloud site (e.g., 104), deploying, at the cloud site (e.g., 104), one or more data plane routers (e.g., 202) configured to handle data plane traffic for a particular address space associated with the cloud site (e.g., 104). For example, based on one or more conditions, a data plane router (e.g., 202) can be deployed at the cloud site (e.g., 104) to handle or process data plane traffic associated with VPC 154N, router 166 in VPC 154N, and/or any elements in VPC 154N (e.g., EPs 168). The one or more conditions can include, for example, an overload condition, a bandwidth need, an available bandwidth reaching a minimum threshold, a performance below a threshold, a need for additional routing capabilities, a violation of a service requirement, etc. For example, a minimum bandwidth threshold or a maximum load threshold can be set which triggers the deployment of one or more additional data plane routers to increase the routing capabilities and available bandwidth for data plane traffic associated with the VPC 154N. In this way, the routing capabilities for data plane traffic in the cloud site (e.g., 104) can be elastic/scalable and dynamically adjusted as needed.

At step 710, the method can include providing, to the on-premises site (e.g., 102), updated routing information from one of the set of control plane routers which identifies (the updated routing information) the one or more data plane routers (e.g., data plane router 202 deployed at step 708) as a next hop for data plane traffic associated with the particular address space. The updated routing information can include a next-hop change (e.g., 204) identifying the one or more data plane routers (e.g., 202) deployed at step 708 as a next hop or a data plane router for data plane traffic to the particular address space (e.g., VPC 154N, router 166, EPs 168, etc.). The on-premises site (e.g., 102) can use the updated routing information to update routes or table of routes to identify the one or more data plane routers as a hop for data plane traffic to the particular address space. In some cases, the method can also include providing the updated routing information to other devices or sites in the multi-cloud fabric (e.g., 100), such as public cloud 106, multi-site controller 110, etc., to identify the one or more data plane routers (e.g., 202) as a next hop or a hop for data plane traffic associated with the particular address space, and inform those recipients of the routing information that the one or more data plane routers (e.g., 202) are configured to handle data plane traffic associated with the particular address space.

In some cases, the method can include translating a respective type of private network construct (e.g., VPC or VNET) in the one or more cloud sites (e.g., 104, 106) to match a set of policies and/or configuration settings associated with a specific type of private network construct (e.g., VRF) in the on-premises site (e.g., 102) to yield a normalized private network across the multi-cloud fabric (e.g., 100), and providing interconnectivity between the on-premises site (e.g., 102) and the one or more cloud sites (e.g., 104 and 106) via the normalized private network. In some cases, inter-site traffic in the multi-cloud fabric (e.g., 100) can then be routed using the normalized private network.

In some aspects, the method can include normalizing a plurality of policy constructs (e.g., EPGs 130-134, security groups 160A-N, application security groups 180A-N, etc.) across the multi-cloud fabric (e.g., 100) by mapping policy constructs (e.g., EPGs, VRFs, etc.) in the on-premises site (e.g., 102) to respective policy constructs (e.g., security groups, application security groups, VPCs, VNETs, etc.) in the one or more cloud sites (e.g., 104, 106), where the policy constructs in the on-premises site (e.g., 102) are a different type of policy construct than the respective policy constructs in the one or more cloud sites (e.g., 104, 106); translating each policy construct from the respective policy constructs to mirror a respective one of the policy constructs from the on-premises site (e.g., 104) that is mapped to the policy construct from the respective policy constructs (e.g., translate EPG 302 to security group 304A and application security group 304B); and in response to receiving traffic associated with one or more endpoints in at least one of the policy construct from the respective policy constructs (e.g., a policy construct from public cloud 104 and/or public cloud 106) and the respective one of the policy constructs from the on-premises site (e.g., 102) that is mapped to the policy construct from the respective policy constructs, applying to the traffic a set of policies associated with the policy construct from the respective policy constructs and the respective one of the policy constructs from the on-premises site.

For example, EPG 130 in the on-premises site 102 can be mapped to security group 160A in the public cloud 104 and application security group 180A in the public cloud 106. The security group 160A in the public cloud 104 and the application security group 180A in the public cloud 106 can then be translated to mirror EPG 130 (e.g., apply the same policies to the same type of traffic and/or destinations). If the public cloud 104 or the public cloud 106 then receives traffic associated with EPG 130 and/or endpoints associated with EPG 130, the public cloud 104 or the public cloud 106 can classify the traffic as being associated with EPG 130 (or the translated security groups mirroring EPG 130) and apply the policies associated with EPG 130 using the translated security group or application security group.

In some aspects, the normalizing of the plurality of policy constructs across the multi-cloud fabric (e.g., 100) can be achieved by stretching a policy construct in the on-premises site (e.g., 102) to the other cloud sites (e.g., 104, 106). For example, in some cases, the method can involve stretching a policy construct (e.g., EPG 130, EPG 132, EPG 134, VRF 136A, VRF 136B, VRF 136N, etc.) from the on-premises site (e.g., 102) to the one or more cloud sites (e.g., 104, 106) to yield a stretched policy construct (e.g., 402) on each of the one or more cloud sites. The stretched policy construct in each cloud site can mirror the policy construct from the on-premises site (e.g., 102).

Continuing with this example, the method can include, for each endpoint (e.g., EPs 158, 164, 168, 184, 188, 192) in the one or more cloud sites (e.g., 104, 106) that is mapped to the stretched policy construct (e.g., 402), providing, to the on-premises site (e.g., 102), an address (e.g., an IP address, an IP prefix, a subnet, etc.) of the endpoint, mapping the address of the endpoint to a shadow policy construct (e.g., 406) on the on-premises site (e.g., 102) which mirrors the stretched policy construct (e.g., 402) on each of the one or more cloud sites (e.g., 104, 106), and for each endpoint in the policy construct from the on-premises site (e.g., 102), mapping the endpoint to a respective shadow policy construct (e.g., 406) on each of the one or more cloud sites (e.g., 104, 106). The respective shadow policy construct can mirror the policy construct from the on-premises site (e.g., 102). In this way, one or more policy constructs in the on-premises site (e.g., 102), such as EPGs or VRFs, can be normalized across the one or more cloud sites (e.g., 104, 106). In some cases, all of the policy constructs in the on-premises site (e.g., 102) or all of the policy constructs in the on-premises site (e.g., 102) that are relevant to the one or more cloud sites (e.g., 104, 106), can be normalized across the multi-cloud fabric (e.g., 100) to maintain a uniform or consistent policy model or policy application that is based on the policy model at the on-premises site (e.g., 102).

In some aspects, the normalizing of the plurality of policy constructs across the multi-cloud fabric (e.g., 100) can be achieved by using contracts or policies between policy constructs on different sites in the multi-cloud fabric (e.g., 100). For example, in some cases, the method can include, based on a policy construct (e.g., EPG 130) in the on-premises site (e.g., 102), creating an associated policy construct (e.g., 422) on each of the one or more cloud sites (e.g., 104, 106), and establishing a security policy (e.g., 424) for traffic between the policy construct (e.g., EPG 130) in the on-premises site (e.g., 102) and the associated policy construct (e.g., 422) on each of the one or more cloud sites (e.g., 104, 106). The method can also include, for each associated policy construct (e.g., 422) on each of the one or more cloud sites (e.g., 104, 106), provisioning, on the on-premises site (e.g., 102), a shadow policy construct (e.g., 426) mirroring the associated policy construct (e.g., 422); and for the policy construct (e.g., EPG 130) in the on-premises site (e.g., 102), provisioning, on each of the one or more cloud sites (e.g., 104, 106), a shadow policy construct (e.g., 428) mirroring the policy construct (e.g., EPG 130) in the on-premises site (e.g., 102).

The method can further include, for each endpoint (e.g., 158, 164, 168, 184, 188, 192) in the one or more cloud sites (e.g., 104, 106) that is mapped to the associated policy construct (e.g., 422), providing, to the on-premises site (e.g., 102), an address (e.g., IP address, IP prefix, subnet, etc.) of the endpoint; mapping each endpoint in the one or more cloud sites (e.g., 104, 106) to the shadow policy construct (e.g., 426) provisioned on the on-premises site (e.g., 102) based on the address of each endpoint; and mapping each endpoint in the policy construct (e.g., EPG 130) in the on-premises site (e.g., 102) to the shadow policy construct (e.g., 428) on each of the one or more cloud sites (e.g., 104, 106).

In some cases, the method can include mapping other endpoints discovered in the multi-cloud fabric (e.g., 100) to a pertinent, normalized policy construct. For example, the method can include, in response to discovering a new endpoint in a cloud site (e.g., 104 or 106), providing an address of the new endpoint to the on-premises site (e.g., 102), and based on the address of the new endpoint, mapping the new endpoint to the shadow policy construct (e.g., 426) provisioned on the on-premises site (e.g., 102). In this way, newly-discovered endpoints can be mapped to a relevant policy construct in the multi-cloud fabric (e.g., 100) to normalize the policies for the newly-discovered endpoints across the multi-cloud fabric (e.g., 100). Since the addresses of an endpoint can be dynamic or dynamically assigned in some cases, the site hosting that endpoint can report the address of the endpoint to other sites, such as the on-premises site (e.g., 102), so the address of the endpoint can be used to map the endpoint to a specific policy construct at the other sites and/or across the multi-cloud fabric (e.g., 100).

In some aspects, the method can include distributing security policies (e.g., 508, 510) associated with endpoints in a cloud site (e.g., 104 or 106) across a plurality of data plane routers (e.g., 506A-N) in the cloud site, where each data plane router receives a respective subset of security policies associated with a set of endpoints in the cloud site that are mapped to that data plane router. The method can also include advertising, by each data plane router from the plurality of data plane routers (e.g., 506A-N) in the cloud site, a respective set of routes (e.g., 512 or 514) associated with the set of endpoints to each private or virtual network (e.g., 154A-N or 178A-N) in the cloud site (e.g., 104 or 106) that contains one or more of the set of endpoints mapped to that data plane router or to each respective router (e.g., 156, 162, 166, 182, 186, or 190) configured to handle traffic associated with the private or virtual network (e.g., 154A-N or 178A-N) in the cloud site (e.g., 104 or 106).

The method can also include, based on border gateway protocol (BGP) route maps (e.g., 606, 608), preventing each data plane router from the plurality of data plane routers (e.g., 506A-N) in the cloud site from advertising routes associated with those of the endpoints in the cloud site that are not mapped to that data plane router, and in response to receiving traffic associated with one or more of the set of endpoints, applying, via the data plane router mapped to one or more of the set of endpoints, one or more of the respective subset of security policies associated with the set of endpoints to the received traffic associated with the one or more of the set of endpoints.

The disclosure now turns to FIGS. 8 and 9, which illustrate example network devices and computing devices, such as switches, routers, client devices, endpoints, servers, and so forth.

FIG. 8 illustrates an example network device 800 suitable for implementing policy agents and performing switching, routing, and other networking operations. Network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the connection 810, to exchange data and signals and coordinate various types of operations by the network device 800, such as routing, switching, and/or data storage operations, for example.

FIG. 9 illustrates a computing system architecture 900 wherein the components of the system are in electrical communication with each other using a connection 905, such as a bus. Exemplary system 900 includes a processing unit (CPU or processor) 910 and a system connection 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware or software service, such as service 1 932, service 2 934, and service 3

936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method for managing routers across a multi-cloud fabric comprising an on-premises site and a cloud site, the method comprising:
    normalizing a plurality of policy constructs across the multi-cloud fabric, comprising:
        mapping policy constructs in the on-premises site to respective policy constructs in the cloud site;
        translating each policy construct from the respective policy constructs to mirror a respective one of the policy constructs from the on-premises site that is mapped to the policy construct from the respective policy constructs;
        applying, to traffic associated with one or more endpoints in at least one of the policy constructs from the respective policy constructs and the respective one of the policy constructs from the on-premises site; and
        applying, a set of policies associated with the policy construct from the respective policy constructs and the respective one of the policy constructs from the on-premises site.

2. The method of claim 1, further comprising:
    providing interconnectivity between the on-premises site and the one or more cloud sites via the multi-cloud fabric.

3. The method of claim 1, wherein the policy constructs in the on-premises site comprise endpoint groups (EPGs) and each of the respective policy constructs in the one or more cloud sites comprises a respective type of security group supported by an associated cloud site from the one or more cloud sites, wherein each EPG contains a first respective set of endpoints from the on-premises site and each of the respective policy constructs in the one or more cloud sites is associated with a second respective set of endpoints from a respective one of the one or more cloud sites.

4. The method of claim 1, wherein after the normalization, traffic flow between the on-premises site and the cloud site occurs without a contract between the on-premises site and the cloud site.

5. The method of claim 1, wherein normalizing the plurality of policy constructs across the multi-cloud fabric further comprises:
for each endpoint in the one or more cloud sites that is mapped to the associated policy construct, providing, to the on-premises site, an address of the endpoint; and
based on the address of each endpoint, mapping each endpoint in the one or more cloud sites to a respective shadow policy construct provisioned on the on-premises site.

6. The method of claim 1, further comprising:
establishing a respective security policy for traffic between each policy construct in the on-premises site and each associated policy construct on each of the one or more cloud sites.

7. The method of claim 1, further comprising:
distributing security policies associated with endpoints in the respective cloud site across a plurality of data plane routers, each data plane router receiving a respective subset of the security policies associated with a respective set of endpoints mapped to that data plane router;
advertising, by each data plane router from the plurality of data plane routers, to each private virtual network in the respective cloud site that contains one or more of the respective set of endpoints mapped to that data plane router a respective set of routes associated with the respective set of endpoints;
based on border gateway protocol (BGP) route maps, preventing each data plane router in the plurality of data plane routers from advertising routes associated with those of the endpoints in the respective cloud site that are not mapped to that data plane router; and
applying, in response to receiving traffic associated with one or more of the respective set of endpoints, to the traffic via the data plane router mapped to the respective set of endpoints, one or more of the respective subset of the security policies associated with the respective set of endpoints.

8. At least one non-transitory computer readable medium storing instructions which, when executed by at least one processor, cause the at least one processor to:
normalize plurality of policy constructs across a multi-cloud fabric, comprising:
map policy constructs in an on-premises site to respective policy constructs in a cloud site;
translate each policy construct from the respective policy constructs to mirror a respective one of the policy constructs from the on-premises site that is mapped to the policy construct from the respective policy constructs;
apply, to traffic associated with one or more endpoints in at least one of the policy construct from the respective policy constructs and the respective one of the policy constructs from the on-premises site; and
applying, a set of policies associated with the policy construct from the respective policy constructs and the respective one of the policy constructs from the on-premises site.

9. The at least one non-transitory computer readable medium of claim 8, further comprising instructions which when executed by the at least one processor causes the at least one processor to:
provide interconnectivity between the on-premises site and the one or more cloud sites via the multi-cloud fabric.

10. The at least one non-transitory computer readable medium of claim 8, wherein the policy constructs in the on-premises site comprise endpoint groups (EPGs) and each of the respective policy constructs in the one or more cloud sites comprises a respective type of security group supported by an associated cloud site from the one or more cloud sites, wherein each EPG contains a first respective set of endpoints from the on-premises site and each of the respective policy constructs in the one or more cloud sites is associated with a second respective set of endpoints from a respective one of the one or more cloud sites.

11. The at least one non-transitory computer readable medium of claim 8, wherein after normalization, traffic flow between the on-premises site and the cloud site occurs without a contract between the on-premises site and the cloud site.

12. The at least one non-transitory computer readable medium of claim 8, further comprising instructions which when executed by the at least one processor causes the at least one processor to:
for each endpoint in the one or more cloud sites that is mapped to the associated policy construct, provide, to the on-premises site, an address of the endpoint; and
based on the address of each endpoint, map each endpoint in the one or more cloud sites to a respective shadow policy construct provisioned on the on-premises site.

13. The at least one non-transitory computer readable medium of claim 8, further comprising instructions which when executed by the at least one processor causes the at least one processor to:
establish a respective security policy for traffic between each policy construct in the on-premises site and each associated policy construct on each of the one or more cloud sites.

14. The at least one non-transitory computer readable medium of claim 8, further comprising instructions which when executed by the at least one processor causes the at least one processor to:
distribute security policies associated with endpoints in the respective cloud site across a plurality of data plane routers, each data plane router receiving a respective subset of the security policies associated with a respective set of endpoints mapped to that data plane router;
advertise, by each data plane router from the plurality of data plane routers, to each private virtual network in the respective cloud site that contains one or more of the respective set of endpoints mapped to that data plane router a respective set of routes associated with the respective set of endpoints;
based on border gateway protocol (BGP) route maps, prevent each data plane router in the plurality of data plane routers from advertising routes associated with those of the endpoints in the respective cloud site that are not mapped to that data plane router; and
apply, in response to receiving traffic associated with one or more of the respective set of endpoints, to the traffic via the data plane router mapped to the respective set of endpoints, one or more of the respective subset of the security policies associated with the respective set of endpoints.

15. A system for managing routers across a multi-cloud fabric, the system comprising:
- at least one processor;
- a non-transitory computer readable medium storing instructions which when executed by the at least one processor causes the at least one processor to:
- normalize plurality of policy constructs across the multi-cloud fabric, comprising:
  - map policy constructs in n on-premises site to respective policy constructs in a cloud site;
  - translate each policy construct from the respective policy constructs to mirror a respective one of the policy constructs from the on-premises site that is mapped to the policy construct from the respective policy constructs; and
  - apply, to traffic associated with one or more endpoints in at least one of the policy construct from the respective policy constructs and the respective one of the policy constructs from the on-premises site, applying, a set of policies associated with the policy construct from the respective policy constructs and the respective one of the policy constructs from the on-premises site.

16. The system of claim 15, further comprising instructions which when executed by the at least one processor causes the at least one processor to:
- provide interconnectivity between the on-premises site and the one or more cloud sites via the multi-cloud fabric.

17. The system of claim 15, wherein the policy constructs in the on-premises site comprise endpoint groups (EPGs) and each of the respective policy constructs in the one or more cloud sites comprises a respective type of security group supported by an associated cloud site from the one or more cloud sites, wherein each EPG contains a first respective set of endpoints from the on-premises site and each of the respective policy constructs in the one or more cloud sites is associated with a second respective set of endpoints from a respective one of the one or more cloud sites.

18. The system of claim 15, wherein after normalization, traffic flow between the on-premises site and the cloud site occurs without a contract between the on-premises site and the cloud site.

19. The system of claim 15, further comprising instructions which when executed by the at least one processor causes the at least one processor to:
- for each endpoint in the one or more cloud sites that is mapped to the associated policy construct, provide, to the on-premises site, an address of the endpoint; and
- based on the address of each endpoint, map each endpoint in the one or more cloud sites to a respective shadow policy construct provisioned on the on-premises site.

20. The system of claim 15, further comprising instructions which when executed by the at least one processor causes the at least one processor to:
- establish a respective security policy for traffic between each policy construct in the on-premises site and each associated policy construct on each of the one or more cloud sites.

* * * * *